US011893929B2

(12) United States Patent
Yang et al.

(10) Patent No.: US 11,893,929 B2
(45) Date of Patent: Feb. 6, 2024

(54) DISPLAY SCREEN RATE CONVERSION METHOD AND TERMINAL

(71) Applicant: GUANGDONG OPPO MOBILE TELECOMMUNICATIONS CORP., LTD., Guangdong (CN)

(72) Inventors: Le Yang, Guangdong (CN); Zhijia Cui, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/812,599

(22) Filed: Jul. 14, 2022

(65) Prior Publication Data

US 2022/0351679 A1 Nov. 3, 2022

Related U.S. Application Data

(63) Continuation of application No. PCT/CN2021/071286, filed on Jan. 12, 2021.

(30) Foreign Application Priority Data

Jan. 14, 2020 (CN) ........................ 202010039092.X
Jan. 14, 2020 (CN) ........................ 202010039097.2
Sep. 30, 2020 (CN) ........................ 202011061844.9

(51) Int. Cl.
*G09G 3/3225* (2016.01)

(52) U.S. Cl.
CPC ... *G09G 3/3225* (2013.01); *G09G 2340/0435* (2013.01)

(58) Field of Classification Search
CPC ..................... G09G 3/3225; G09G 3/30–3291
See application file for complete search history.

(56) References Cited

U.S. PATENT DOCUMENTS

2009/0251445 A1* 10/2009 Ito ........................ G09G 3/3648
345/204
2012/0293479 A1 11/2012 Han
(Continued)

FOREIGN PATENT DOCUMENTS

CN 1870095 11/2006
CN 101202033 6/2008
(Continued)

OTHER PUBLICATIONS

WIPO, International Search Report and Written Opinion for iPCT/CN2021/071286, dated Mar. 26, 2021.
(Continued)

*Primary Examiner* — Hang Lin
(74) *Attorney, Agent, or Firm* — Hodgson Russ LLP

(57) ABSTRACT

A display screen frequency conversion method and a terminal (1100). The method is applied to a DDIC chip of an OLED display screen, including: initializing display screen parameters according to a first refresh rate; in response to receiving first image data sent by an AP, performing an image scanning according to the first refresh rate; in response to not receiving second image data sent by the AP within a preset delay duration of a VFP corresponding to the first refresh rate, adjusting the first refresh rate to a second refresh rate; wherein the second refresh rate is less than the first refresh rate; and adjusting the display screen parameters according to the second refresh rate.

17 Claims, 11 Drawing Sheets

(56) References Cited

U.S. PATENT DOCUMENTS

| | | | | |
|---|---|---|---|---|
| 2013/0265294 | A1 | 10/2013 | Kim | |
| 2013/0335309 | A1* | 12/2013 | Kerofsky | G09G 3/3406 345/102 |
| 2014/0092150 | A1 | 4/2014 | Slavenburg et al. | |
| 2017/0004766 | A1 | 1/2017 | Cho et al. | |
| 2017/0148390 | A1 | 5/2017 | Park et al. | |
| 2017/0193971 | A1 | 7/2017 | Bi et al. | |
| 2019/0109985 | A1* | 4/2019 | Chang | H04N 23/90 |
| 2020/0035188 | A1* | 1/2020 | Kim | G09G 3/3685 |

FOREIGN PATENT DOCUMENTS

| | | |
|---|---|---|
| CN | 102543023 | 7/2012 |
| CN | 103000159 | 3/2013 |
| CN | 104134415 | 11/2014 |
| CN | 104269155 | 1/2015 |
| CN | 105760132 | 7/2016 |
| CN | 106020717 | 10/2016 |
| CN | 106910448 | 6/2017 |
| CN | 106933526 | 7/2017 |
| CN | 107045848 | 8/2017 |
| CN | 107799053 | 3/2018 |
| CN | 107818772 | 3/2018 |
| CN | 108922466 | 11/2018 |
| CN | 109272931 | 1/2019 |
| CN | 109412704 | 3/2019 |
| CN | 109597574 | 4/2019 |
| CN | 109640168 | 4/2019 |
| CN | 109828686 | 5/2019 |
| CN | 110045878 | 7/2019 |
| CN | 110174969 | 8/2019 |
| CN | 110675824 | 1/2020 |
| CN | 111968582 | 11/2020 |
| JP | H08248925 | 9/1996 |

OTHER PUBLICATIONS

CNIPA, First Office Action for CN Application No. 202011061844.9, dated Apr. 27, 2021.

CNIPA, Second Office Action for CN Application No. 202011061844.9, dated Nov. 24, 2021.

CNIPA, Notification to Grant Patent Right for Invention for CN Application No. 202011061844.9, dated Feb. 21, 2022.

EPO, Extended European Search Report for EP Application No. 21741489.5, dated May 2, 2023.

* cited by examiner

DISPLAY SCREEN RATE CONVERSION METHOD AND TERMINAL

CROSS REFERENCE

The present application is a continuation of International Patent Application No. PCT/CN2021/071286, filed Jan. 12, 2021, which claims priority to: Chinese Patent Application No. 202010039097.2, filed Jan. 14, 2020; Chinese Patent Application No. 202010039092.X, filed Jan. 14, 2020; and Chinese Patent Application No. 202011061844.9, filed Sep. 30, 2020. The entire disclosures of the aforementioned applications are incorporated herein by reference.

TECHNICAL FIELD

The present disclosure relates to the field of display technologies, and in particular to a display screen rate conversion method and a terminal.

BACKGROUND

With the continuous development of display technology, more and more high refresh rate displays have been created to improve the smoothness of the screen by setting the display to high refresh rate mode when running high frame rate applications or during swipe operations.

For active-matrix organic light-emitting diode (AMOLED) displays, limited by the application processor (AP), driving architecture of the DDIC-panel, and self-emitting characteristics of the AMOLED display, in the related art, the refresh rate of AMOLED display is required to be adjusted manually or semi-automatically.

However, with the above refresh rate adjustment method, if the refresh rate is not adjusted in time, when the rendering speed of the AP decreases, the DDIC chip still needs the control panel to refresh according to a high refresh rate, which increases the power consumption of the display.

SUMMARY OF THE DISCLOSURE

The present disclosure provides a display screen rate conversion method and a terminal.

In a first aspect, the present disclosure provides a display screen rate conversion method, applied to a display driver integrated circuit (DDIC) chip of an organic light-emitting diode (OLED) display screen, comprising: initializing display screen parameters according to a first refresh rate; in response to receiving first image data sent by an application processor (AP), performing an image scanning according to the first refresh rate; in response to not receiving second image data sent by the AP within a preset delay duration of a vertical front porch (VFP) corresponding to the first refresh rate, adjusting the first refresh rate to a second refresh rate; wherein the second refresh rate is less than the first refresh rate; and adjusting the display screen parameters according to the second refresh rate.

In a second aspect, the present disclosure provides a display screen rate conversion method, applied to a display driver integrated circuit (DDIC) chip of an organic light-emitting diode (OLED) display screen, comprising: initializing display screen parameters according to a first refresh rate; in response to receiving first image data sent by an application processor (AP), performing an image scanning according to the first refresh rate; in response to receiving second image data sent by the AP within a preset delay duration of a vertical front porch (VFP) corresponding to the first refresh rate, obtaining a time interval between a current moment and a falling edge of a n-th light-emitting (EM) start vertical (ESTV); wherein the n-th ESTV is a next ESTV of the current moment; and adjusting the VFP according to the time interval, wherein a timing of a gate start vertical (GSTV) and a timing of an ESTV match after the VFP is adjusted.

In a third aspect, the present disclosure provides a mobile terminal, comprising an application processor (AP), an organic light-emitting diode (OLED) display screen, and a display driver integrated circuit (DDIC); wherein the AP and the DDIC chip are connected to each other through a mobile industry processor interface (MIPI); the DDIC chip is configured to perform a display screen rate conversion method as described above.

DETAILED DESCRIPTION

In order to make the objectives, technical solutions, and advantages of the present disclosure clearer, the embodiments of the present disclosure will be described in further detail below in conjunction with the accompanying drawings.

The "plurality" mentioned herein means two or more. "And/or" describes the association relationship of associated objects, indicating that there may be three types of relationships. For example, A and/or B may mean: A alone exists, A and B exist at the same time, and B exists alone. The character "/" generally indicates that the associated objects before and after are in an "or" relationship.

To facilitate understanding, the terms involved in the embodiments of the present disclosure are described below.

Tearing effect (TE) signal: a signal generated by a DDIC chip to prevent tearing when the image is refreshed during image display. When ready to refresh a next frame of image, the DDIC chip generates the TE signal. In some embodiments, an AP sends the next frame of image data to the DDIC chip after monitoring a rising edge of the TE signal or detecting that the TE signal is in a high state.

Gate signal: a panel row switch signal, configured to control a source voltage to enter a channel of a current row of pixel circuits, so as to realize the data refresh of the current row of pixels. Correspondingly, a Gate-Timing is configured to indicate a related timing of the Gate signal, and mainly refers to a gate start signal (gate start vertical, GSTV). One frame includes one GSTV.

EM signal: a panel row switch signal, configured to control whether the current row of pixels emit light. Correspondingly, an EM-Timing is configured to indicate a relative timing of the EM signal, and mainly refers to an emitting start signal (EM start vertical, ESTV). One frame includes multiple ESTVs.

EM pulse number (EM-Pulse-No): to achieve pulse width modulation (PWM) to adjust the brightness of the display at low brightness. An EM-Frequency (EM-FR) is usually an integer multiple of a Gate-Frequency (Gate-FR), that is, multiple EM switches are performed in one Gate frame. Correspondingly, the EM-Pulse-No indicates the number of EM frames in one Gate frame. For example, when Gate-FR is 60 Hz, EM-FR is 240 Hz, and EM-Pulse-No is 4. It should be noted that due to the self-emitting characteristics of the AMOLED display, in the same frame, ESTV is required to be strictly matched to GSTV (a turn-off timing of the first EM signal is required to match the Gate-Timing), and the remaining EM signals are equally distributed by the DDIC chip.

Figure 1:
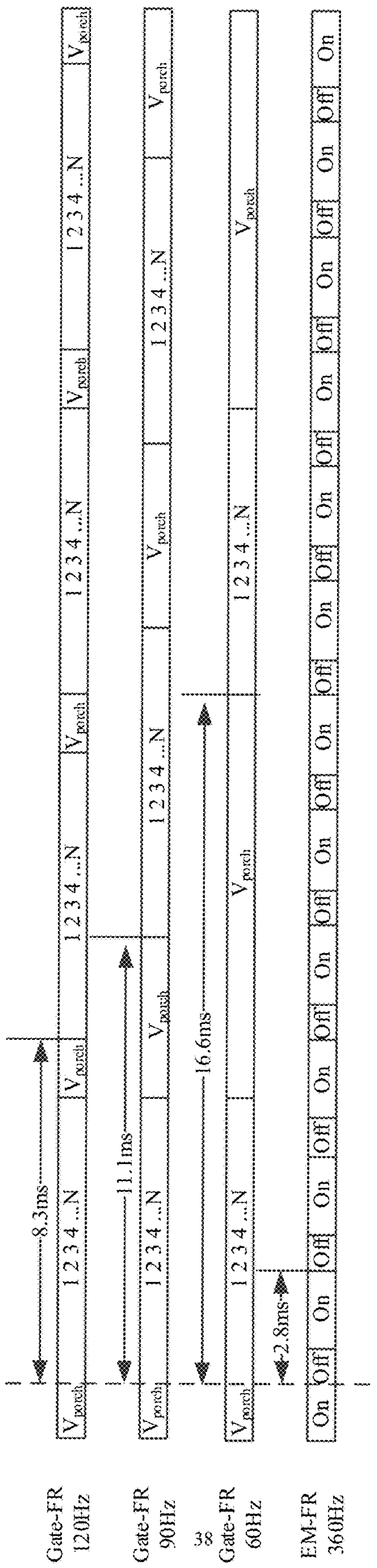
FIG. 1 is a view illustrating a timing relationship between a Gate signal and an EM signal under different Gate-FR, according to an embodiment of the present disclosure.

Illustratively, under different Gate-FR, the timing relationship between the Gate signal and the EM signal is shown in FIG. 1. EM-FR and duty cycle remain stable, so as to avoid sudden changes in brightness caused by Gate-FR changes. In FIG. 1, when the Gate-FR is 60 Hz/90 Hz/120 Hz, both EM-FR and duty cycle remain unchanged (360 Hz). In addition, in order to minimize the influence of Gate-FR changes on Gamma and remove unevenness (Demura) parameters, it is necessary to keep the Gate scanning speed unchanged, that is, the time for the Gate to scan one row remains the same and the time to complete a frame refresh is unchanged, and only extend a vertical porch (Vporch). In FIG. 1, when the Gate-FR is 60 Hz/90 Hz/120 Hz, each frame scan is completed within 8.3 ms.

Figure 2:
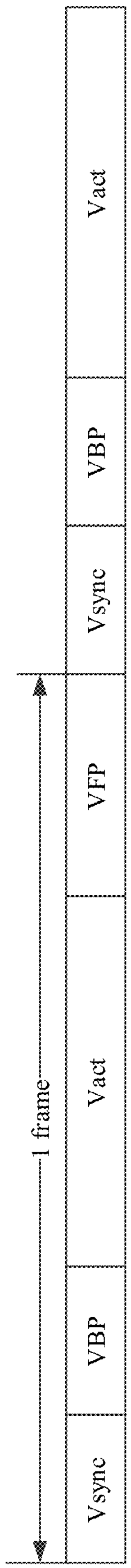
FIG. 2 is a view illustrating a timing relationship between Vsync, VFP, VBP, and Vact.

Vporch: including a vertical synchronous signal (Vsync), a vertical front porch (VFP), and a vertical back porch (VBP). Illustratively, the relationship among Vsync, VFP, VBP, and the number of vertical active rows (Vact) in a column direction (vertically) is shown in FIG. 2. When the Vporch is extended as described above, the VFP is mainly extended.

For an OLED display with AP-DDIC-Panel architecture, after the AP side renders and generates image data, the image data is sent to the DDIC chip, and the DDIC chip controls the panel to display an image according to the image data. In a high refresh rate display scene, the AP side generates high-rate image data. Correspondingly, the panel side performs high-rate image refresh based on the image data, thereby improving the smoothness of the screen.

In an actual application process, in addition to achieving high refresh rate in high frame rate games, high frame rate is mainly used in some fast-sliding scenes such as desktop sliding and photo album browsing, for improving the smoothness of the screen when users perform fast-sliding operations. However, fast sliding takes a relatively small proportion of time in practical applications, and most of the usage scenes are still static display, low-speed sliding, and low frame rate video play scenes. In the above application scenes, the image rendering speed on the AP side is reduced, while the panel side still maintains a high refresh rate for image refresh (when the AP side does not send new image data, a single frame of image will be displayed repeatedly). In this case, the smoothness of the screen will not be improved, but the power consumption of the display will be increased.

In the related art, to reduce the power consumption of high refresh rate displays, manual frame rate (MFR) is usually applied to adjust the refresh rate of high refresh rate displays, that is, the user is required to manually adjust the refresh rate according to the current application scene, thereby triggering the AP to send a rate conversion command to the DDIC chip, and the DDIC chip adjusts the refresh rate of the panel according to the rate conversion command.

For example, when the terminal is running a high frame rate game, the user may manually set the refresh rate of the display to 120 Hz, and when exiting the high frame rate game, the user may manually set the refresh rate of the display to 60 Hz.

Figure 3:
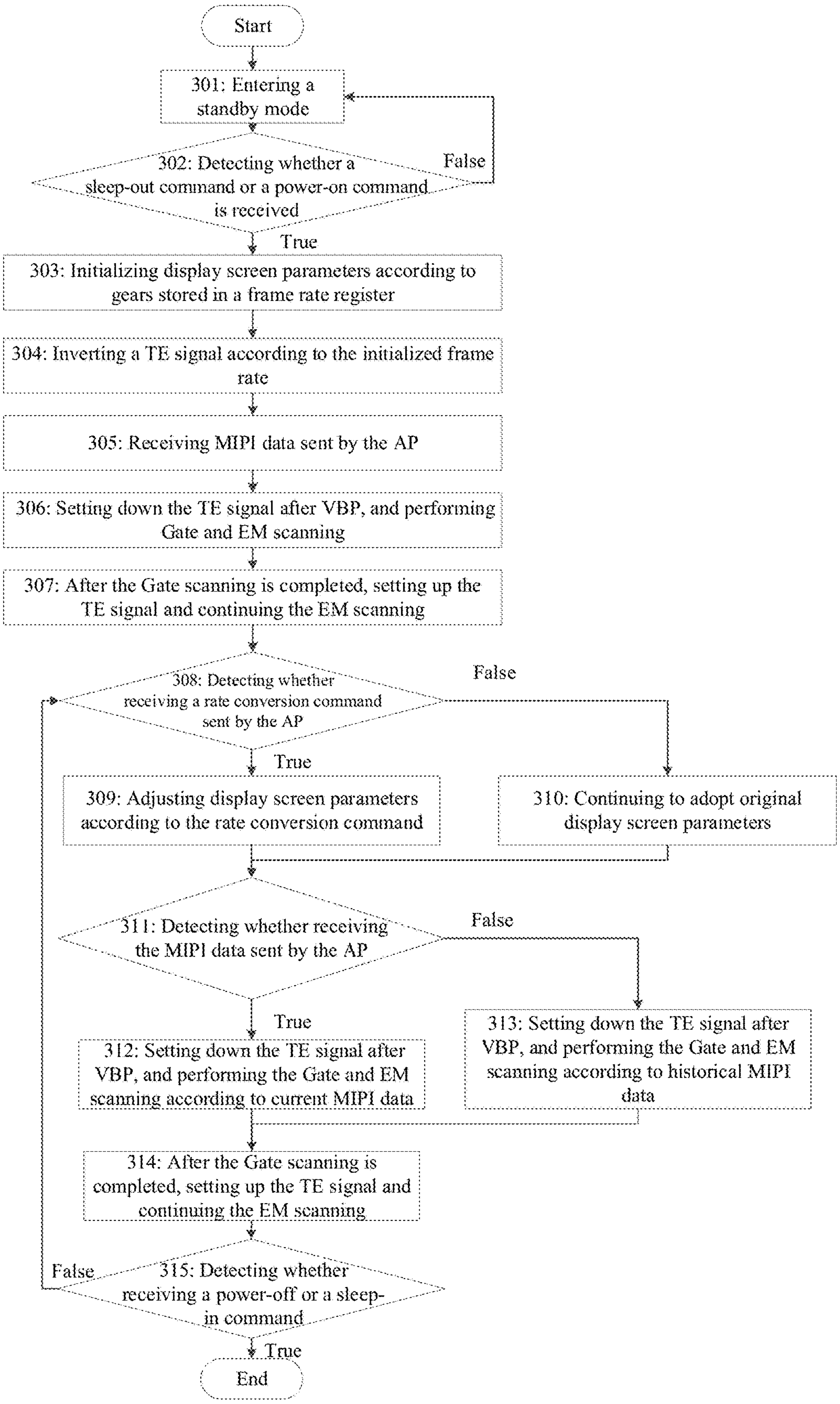
FIG. 3 is a flowchart of a DDIC chip performing a rate conversion process according to a rate conversion command in the related art.

In an illustrative example, when the AP side determines that rate conversion is required (according to either a manual trigger from the user or an automatic identification of the scene by the AP), the AP side sends the rate conversion command to the DDIC chip through MIPI. Correspondingly, the DDIC chip adjusts the display refresh rate according to the rate conversion command as shown in FIG. 3.

At block 301: Entering a standby mode.

At block 302: Detecting whether a sleep-out command or a power-on command is received; when the sleep-out command or the power-on command is detected to be received, step 303 is performed; when the sleep-out command or the power-on command is not detected to be received, step 301 is performed.

At block 303: Initializing display screen parameters according to gears stored in a frame rate register.

Among them, the frame rate register stores frame rate gears (that is, refresh rate gears) supported by the display screen. For example, the gears stored in the frame rate register include 60 Hz/90 Hz/120 Hz. Correspondingly, the initialized display parameters include VFP, EM-Pulse-No, Gamma, and Demura. For example, the DDIC chip initializes the display screen parameters according to the frame rate gear of 60 Hz.

At block 304: Inverting a TE signal according to the initialized frame rate.

Among them, the TE signal is turned low at Vact and turned high at Vporch.

At block 305: Receiving MIPI data sent by the AP.

The MIPI data is image data rendered on the AP side, and the MIPI data is sent through MIPI when the AP detects a rising edge of the TE signal and the image data is ready.

At block 306: Setting down the TE signal after VBP, and performing Gate and EM scanning.

During the Gate and EM scanning, DDIC controls EM-Timing and matches Gate-Timing.

At block 307: After the Gate scanning is completed, setting up the TE signal and continuing the EM scanning.

At block 308: Detecting whether receiving a rate conversion command sent by the AP; when the rate conversion command is received, performing step 309; when the rate conversion command is not received, performing step 310.

At block 309: Adjusting display screen parameters according to the rate conversion command.

Optionally, the rate conversion command includes a target frame rate, and DDIC obtains target display screen parameters corresponding to the target frame rate from the frame rate register, and adjusts the parameters according to the target display screen parameters to reduce the influence of rate conversion on the screen display.

At block 310: Continuing to adopt original display screen parameters.

When the rate conversion command is received, the DDIC chip continues to scan the image according to the initialized display screen parameters.

At block 311: Detecting whether receiving the MIPI data sent by the AP; when the MIPI data sent by the AP is received, performing step 312; when the MIPI data sent by the AP is not received, performing step 313.

At block 312: Setting down the TE signal after VBP, and performing the Gate and EM scanning according to current MIPI data.

When the new MIPI data sent by the AP is received, the DDIC chip will control the display screen to update the screen according to the MIPI data.

At block 313: Setting down the TE signal after VBP, and performing the Gate and EM scanning according to historical MIPI data.

When the new MIPI data sent by the AP is not received, the DDIC chip will repeatedly display the previous frame according to the MIPI data corresponding to the previous frame of image.

At block 314: After the Gate scanning is completed, setting up the TE signal and continuing the EM scanning.

At block 315: Detecting whether receiving a power-off command or a sleep-in command; when the power-off command or sleep-in command is received, ending the process; and when the power-off command or sleep-in command is not received, performing cyclically the step 308.

Obviously, when the above-mentioned manual rate conversion scheme is adopted, the user (or AP) needs to determine to reduce or increase the refresh rate of the display screen according to the current application scenario, and trigger it manually. For example, when using a terminal to read e-books, because most of the e-book reading scenes display static text, the user has to manually set the refresh rate of the display to 30 Hz; when using the terminal to play games, because the game scene is mostly high frame, the user has to manually set the refresh rate of the display to 120 Hz.

The above adjustment process is complicated (especially in a fast sliding scene, such as a system desktop sliding scene), and the accuracy is low (errors may occur when the user artificially judges the timing of the refresh rate switching).

In order to solve the above technical problems, the embodiments of the present disclosure provide an adaptive frame rate (AFR) solution. Under this solution, the DDIC chip uses a VFP automatic delay mechanism while waiting for the AP to send image data; when detecting that the AP rendering speed is too slow, the DDIC chip automatically reduces the refresh rate of the panel, which realizes the adaptive matching of the panel-side refresh rate and the AP-side rendering rate, and reduces the panel power consumption; in addition, when detecting that the AP rendering speed increases, the DDIC chip automatically increases the refresh rate of the panel, which improves the smoothness of the screen display.

The entire adjustment process is automatically completed by the DDIC chip according to the rendering rate on the AP side (not triggered by a rate conversion command sent by the AP), without the user's manual triggering, which simplifies the adjustment process and improves the accuracy and timeliness of the rate conversion. Illustrative embodiments are used for description below.

Figure 4:
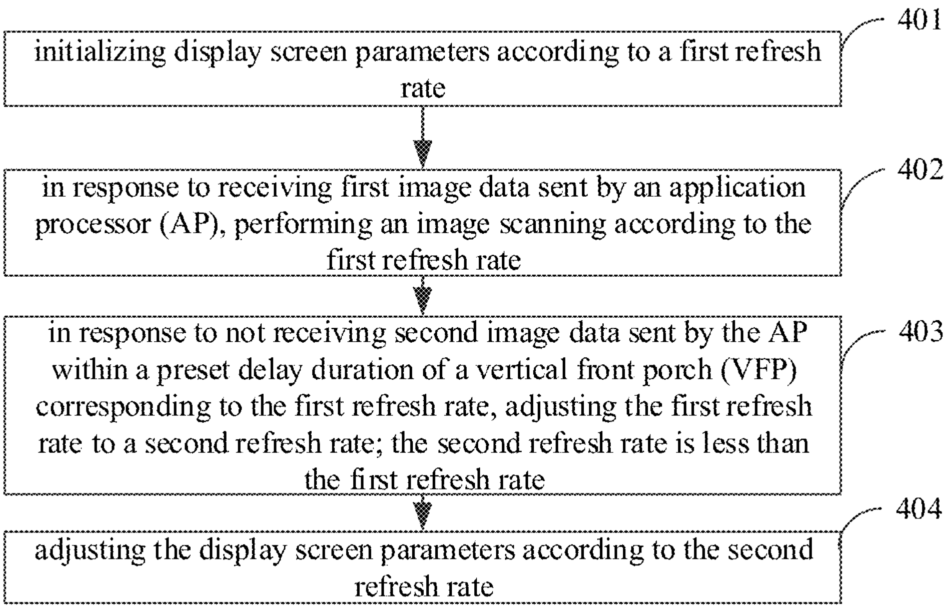
FIG. 4 is a flowchart of a display screen rate conversion method according to an embodiment of the present disclosure.

Referring to FIG. 4, FIG. 4 is a flowchart of a display screen rate conversion method according to an embodiment of the present disclosure. In the embodiment, the method is applied to a display driver integrated circuit (DDIC) chip of an organic light-emitting diode (OLED) display screen as an example. The method includes operations at blocks illustrated herein.

At block 401: initializing display screen parameters according to a first refresh rate.

In the embodiment of the present disclosure, the OLED display screen supports at least two refresh rates. In some embodiments, in a standby mode, when a sleep-out command or a power-on command is received (for example, when the screen, which is originally off, is turned on), the DDIC chip initializes the display parameters according to a default gear (i.e., the first refresh rate) stored in a frame rate register.

In some embodiments, the OLED display screen supports three refresh rates of 60 Hz, 90 Hz, and 120 Hz, and the DDIC chip initializes the parameters according to the display screen parameters corresponding to 120 Hz.

In some embodiments, the display screen parameters initialized by the DDIC chip include Gamma parameters and Demura parameters. Correspondingly, the DDIC chip initializes the Gamma parameters and Demura parameters corresponding to the first refresh rate.

At block 402: in response to receiving first image data sent by an application processor (AP), performing an image scanning according to the first refresh rate.

In some embodiments, the image scanning includes a Gate scanning and an EM scanning.

In some embodiments, the OLED display screen is an AMOLED display screen; after the initialization of the display screen parameters is completed, when the image data sent by the AP is received, the DDIC chip controls the AMOLED display screen to perform the image scanning according to the first refresh rate.

In some embodiments, since the AP may send data other than image data to the DDIC chip, the DDIC chip may parse data after receiving the data sent by the AP, and when the data parsing reaches 0x2C, the data is determined to be the image data.

It should be noted that when performing the image scanning, the DDIC chip needs to keep matching of Gate-Timing and EM-Timing, to meet EM requirements of the OLED display.

At block 403: in response to not receiving second image data sent by the AP within a preset delay duration of a vertical front porch (VFP) corresponding to the first refresh rate, adjusting the first refresh rate to a second refresh rate; the second refresh rate is less than the first refresh rate.

Different from the related art, the rate conversion of the display screen is dominated by the AP, and the DDIC chip can only perform passive rate conversion after receiving the rate conversion command issued by the AP. In the embodiments of the present disclosure, during that the DDIC chip is waiting for the AP to send the image data of a next frame of image (i.e., the second image data), it is determined whether the image data is sent overtime according to a built-in VFP timeout timer. When the sending is not overtime (that is, the second image data is received within the VFP duration corresponding to the first refresh rate), the image is continued to be updated according to the first refresh rate; when the sending is timed out (that is, the second image data is not received within the preset delay duration of the VFP corresponding to the first refresh rate), it is determined that the AP side image rendering rate is lower than the current refresh rate of the display screen, and the refresh rate of the OLED display screen is adjusted.

In some embodiments, when the DDIC chip adjusts the first refresh rate to the second refresh rate, the second refresh rate is the minimum refresh rate supported by the OLED display, that is, the DDIC chip directly reduces the refresh rate to the minimum. In other embodiments, the second refresh rate is a next-level refresh rate of the first refresh rate, that is, the DDIC chip gradually reduces the refresh rate to the minimum.

In some embodiments, when the OLED display screen is set with three refresh rates, namely 60 Hz, 90 Hz and 120 Hz, the DDIC chip first scans the image at 120 Hz. When the second image data sent by the AP is not received within the preset delay duration of the refresh frequency of 120 Hz corresponding to the VFP, the refresh frequency of the OLED display is adjusted to 90 Hz.

At block 404: adjusting the display screen parameters according to the second refresh rate.

To avoid the effect of large-range rate reduction on the screen display, in some embodiments, after adjusting the refresh rate of the display screen, the DDIC chip performs a parameter adjustment according to the display screen parameters corresponding to the second refresh rate in the frame rate register.

In some embodiments, the display parameters corresponding to the first refresh rate (120 Hz) are Gamma 120 Hz and Demura 120 Hz, respectively. When the first refresh rate is adjusted to the second refresh rate (90 Hz), the DDIC chip adjusts the display parameters to Gamma 90 Hz and Demura 90 Hz.

Obviously, compared to the related art in which the AP shall actively send the rate conversion command to trigger the DDIC chip to perform rate conversion, in the embodiments of the present disclosure, the AP's work flow is consistent with a work flow in the fixed frame rate (i.e., the fixed refresh rate of the display screen), and there is no need to send the rate conversion command to the DDIC. The DDIC chip can adjust the refresh rate of the display screen adaptively according to the rendering rate on the AP side without the user's perception, eliminating the process of issuing a rate conversion command by the AP. In addition, when the AP sends the image data, there is no need to strictly match the timing of the DDIC chip, and no rate conversion logic determination is required, which simplifies the processing flow of the AP during the rate conversion process.

In summary, in the embodiments of the present disclosure, the DDIC chip initializes the display screen parameters according to the first refresh rate of the OLED display screen, and performs image scanning on the first image data sent by the AP according to the first refresh rate. When the second image data sent by the AP is not received within the preset delay duration of the first refresh rate corresponding to the VFP, that is, when the image rendering speed of the AP decreases, the DDIC chip lowers the refresh rate of the OLED display and adjusts the display parameters accordingly. Through the introduction of VFP automatic delay mechanism and adaptive adjustment of the refresh rate of the display according to the speed at which the AP transmits image data, the refresh rate of the display matches the image rendering speed of the AP, thereby realizing the adaptive dynamic rate conversion of the OLED display and further reducing the power consumption of the OLED display.

In an illustrative application scenario, after applying the display rate conversion method provided in the above embodiments to a terminal arranged with an AMOLED display, after the user lights up the display screen, the AP renders the static system desktop at low speed. In this case, the DDIC chip automatically adjusts the refresh rate of the display screen to 60 Hz.

When the user clicks on a game application icon on the system desktop, the AP renders the game screen at the maximum rendering rate. In this case, the DDIC chip increases the refresh rate of the display to 120 Hz according to the AP rendering rate to ensure the smoothness of the game screen.

When the game application is exited, the DDIC chip may gradually lower the refresh rate from 120 Hz to 60 Hz due to the reduction in the screen rendering rate of the AP. When the user performs a sliding operation process on the system desktop, the AP increases the screen rendering rate, and accordingly, the DDIC chip automatically increases the refresh rate of the display to 120 Hz, which improves the fluency of the system desktop when sliding.

In some embodiments, the performing an image scanning according to the first refresh rate includes operations as followed.

Generating a vertical synchronous signal (Vsync) according to the VFP corresponding to the first refresh rate.

Matching a timing of a first EM start vertical (ESTV) with a timing of a vertical back porch (VBP), and performing an EM scanning according to an EM frequency; a position of the VBP is determined according to a position of the Vsync.

Matching a timing of a first gate start vertical (GSTV) and the timing of the first ESTV, and performing a gate scanning according to the first refresh rate.

In some embodiments, when the second image data sent by the AP is not received within the preset delay duration of the VFP corresponding to the first refresh rate, the adjusting the first refresh rate to the second refresh rate includes operations as followed.

In response to not receiving the second image data within the VFP corresponding to the first refresh rate, automatically extending the VFP by an extended duration.

In response to the extended duration reaching the preset delay duration and not receiving the second image data, adjusting the first refresh rate to the second refresh rate; the preset delay duration is determined according to the VFP corresponding to the second refresh rate.

In some embodiments, after adjusting the first refresh rate to the second refresh rate, the method further includes operations as followed.

Adjusting the VFP according to a position of a next ESTV, wherein a timing of a GSTV matches with a timing of the next ESTV after the VFP is adjusted.

In some embodiments, the method further includes operations as followed.

After completing the image scanning, setting high a tearing effect (TE) signal and maintaining the TE signal at a high level; the AP is configured to send the generated image data when the TE signal is at a high level.

In some embodiments, after the initializing the display screen parameters according to the first refresh rate, the method further includes operations as followed.

Inverting a TE signal according to the first refresh rate; the AP is configured to determine whether the generated image data exists in response to detecting a rising edge of the TE signal.

After performing the image scanning according to the first refresh rate, the method further includes operations as followed.

Inverting the TE signal according to a preset inversion rate; the preset inversion rate is greater than the first refresh rate.

In some embodiments, the method further includes operations as followed.

Receiving an EM frequency conversion command issued by the AP.

Adjusting the EM frequency according to the EM frequency conversion command; the adjusted EM frequency is an integer multiple of a current refresh rate.

In some embodiments, after the adjusting the display screen parameters according to the second refresh rate, the method further includes operations as followed.

In response to receiving third image data sent by the AP within the VFP corresponding to the first refresh rate, adjusting the second refresh rate to the first refresh rate.

Adjusting the display screen parameters according to the first refresh rate.

In some embodiments, the first refresh rate is a maximum refresh rate of the OLED display screen.

In some embodiments, the adjusting the first refresh rate to the second refresh rate includes operations as followed.

Adjusting the first refresh rate to the second refresh rate in a step-by-step manner; the second refresh rate and the first refresh rate are adjacent refresh rates in terms of values.

In some embodiments, the method is applied for a DDIC chip of an OLED display screen in a mobile terminal.

In the related art, to meet the stringent EM requirements of AMOLED displays, it is necessary to ensure that EM-Timing matches Gate-Timing. When the method provided in the embodiments of the present disclosure is used to adjust the display refresh rate, the DDIC chip takes the lead in EM-Timing and EM-FR and no longer needs to match Gate-Timing but Gate-Timing actively matches the timing of EM-Timing.

Moreover, when there is a short delay in AP rendering, to enable the image data rendered by the AP to be issued to the DDIC chip for image scanning in time, the DDIC chip adapts the way the TE signal is generated.

In addition to the large-range rate conversion scenario, there are some small-range rate conversion scenarios (that is, there is a small delay in the rendering rate of the AP). In the related art, in a small-range rate conversion scenario, after the AP detects the rising edge of TE, it detects whether the image data is ready. When the image data is ready, the image data is sent to the DDIC chip through MIPI; when the image data is not ready, a timeout duration (that is, how long it takes for the image data to be ready) is calculated and a timeout command is sent to the DDIC chip via MIPI such that the DDIC chip can adjust the relevant parameters according to the timeout command.

Figure 5:
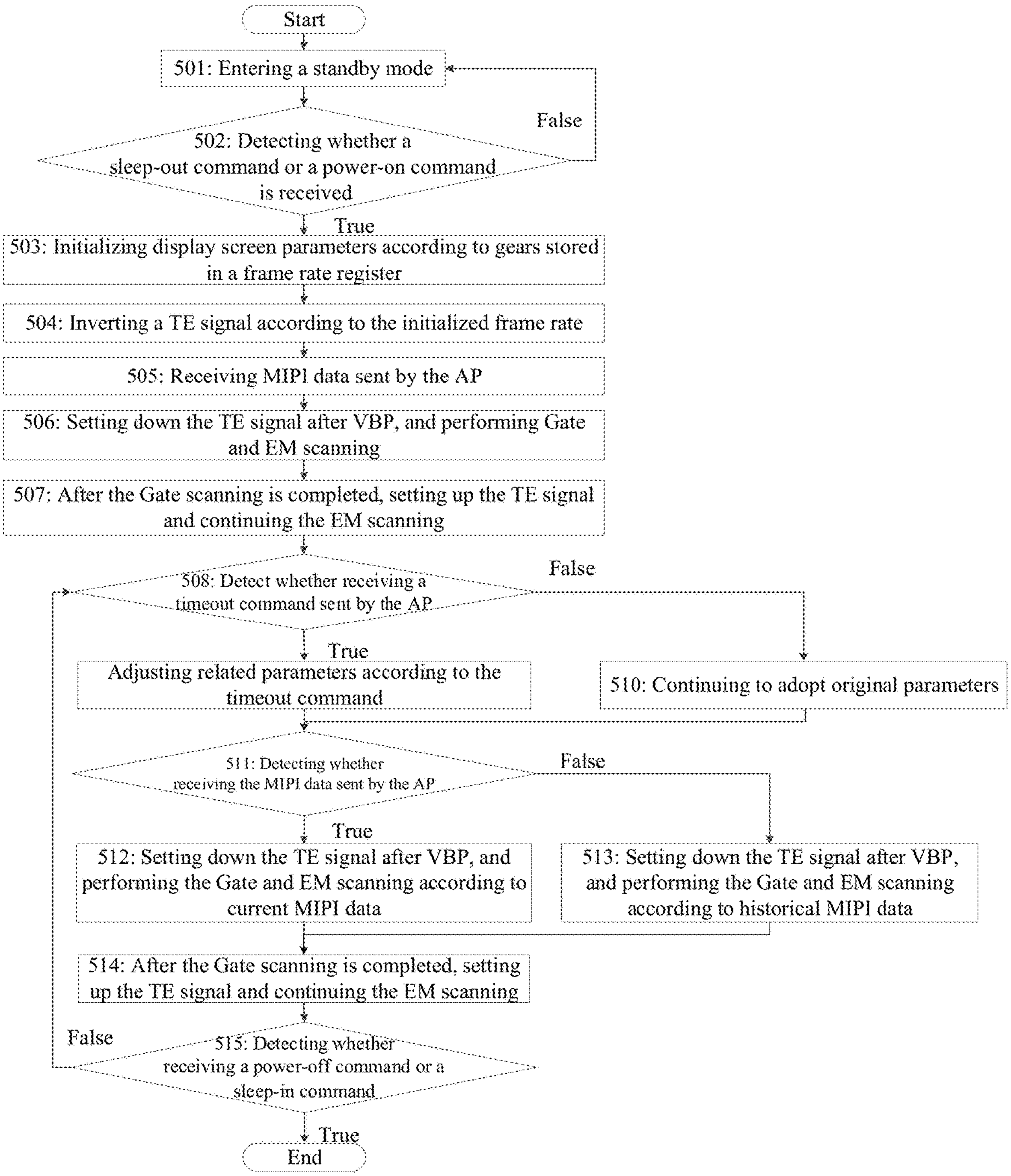
FIG. 5 is a flowchart of a DDIC chip performing a small-range rate conversion process in the related art.

In an illustrative example, a process of DDIC chip performing a small-range rate conversion is shown in FIG. 5.

At block 501: Entering a standby mode.

At block 502: Detecting whether a sleep-out command or a power-on command is received. When the sleep-out command or the power-on command is detected to be received, step 503 is performed; when the sleep-out command or the power-on command is not detected to be received, step 501 is performed.

At block 503: Initializing display screen parameters according to gears stored in a frame rate register.

At block 504: Inverting a TE signal according to the initialized frame rate.

At block 505: Receiving MIPI data sent by the AP.

At block 506: Setting down the TE signal after VBP, and performing Gate and EM scanning.

At block 507: After the Gate scanning is completed, setting up the TE signal and continuing the EM scanning.

At block 508: Detect whether receiving a timeout command sent by the AP; when the timeout command is received, performing step 50; when the timeout command is not received, performing step 510.

At block 509: Adjusting related parameters according to the timeout command.

Optionally, since the impact of small-range rate conversion on Gamma and Demura is negligible, the relevant parameters adjusted by the DDIC chip according to the timeout command are VFP and EM-Pulse-No.

At block 510: Continuing to adopt original parameters.

At block 511: Detecting whether receiving the MIPI data sent by the AP; when the MIPI data sent by the AP is received, performing step 512; when the MIPI data sent by the AP is not received, performing step 513.

At block 512: Setting down the TE signal after VBP, and performing the Gate and EM scanning according to current MIPI data.

When the new MIPI data sent by the AP is received, the DDIC chip will control the display screen to update the screen according to the MIPI data.

At block 513: Setting down the TE signal after VBP, and performing the Gate and EM scanning according to historical MIPI data.

When the new MIPI data sent by the AP is not received, the DDIC chip will repeatedly display the previous frame according to the MIPI data corresponding to the previous frame of image.

At block 514: After the Gate scanning is completed, setting up the TE signal and continuing the EM scanning.

At block 515: Detecting whether receiving a power-off command or a sleep-in command; when the power-off command or sleep-in command is received, ending the process; and when the power-off command or sleep-in command is not received, performing cyclically the step 508.

However, when using the above method to achieve small-range rate conversion, the AP needs to consider not only the rendering speed, but also the EM timing when calculating the timeout duration, to ensure that GSTV and ESTV are strictly matched, and the calculation process is complicated. In addition, the above small-range rate conversion mode and large-range rate conversion mode cannot be performed at the same time.

However, in the embodiments of the present disclosure, the small-range rate conversion scheme and the large-range rate conversion scheme are compatible, which expands the application scenario of the display screen rate conversion. Illustrative embodiments are used for description below.

Figure 6:
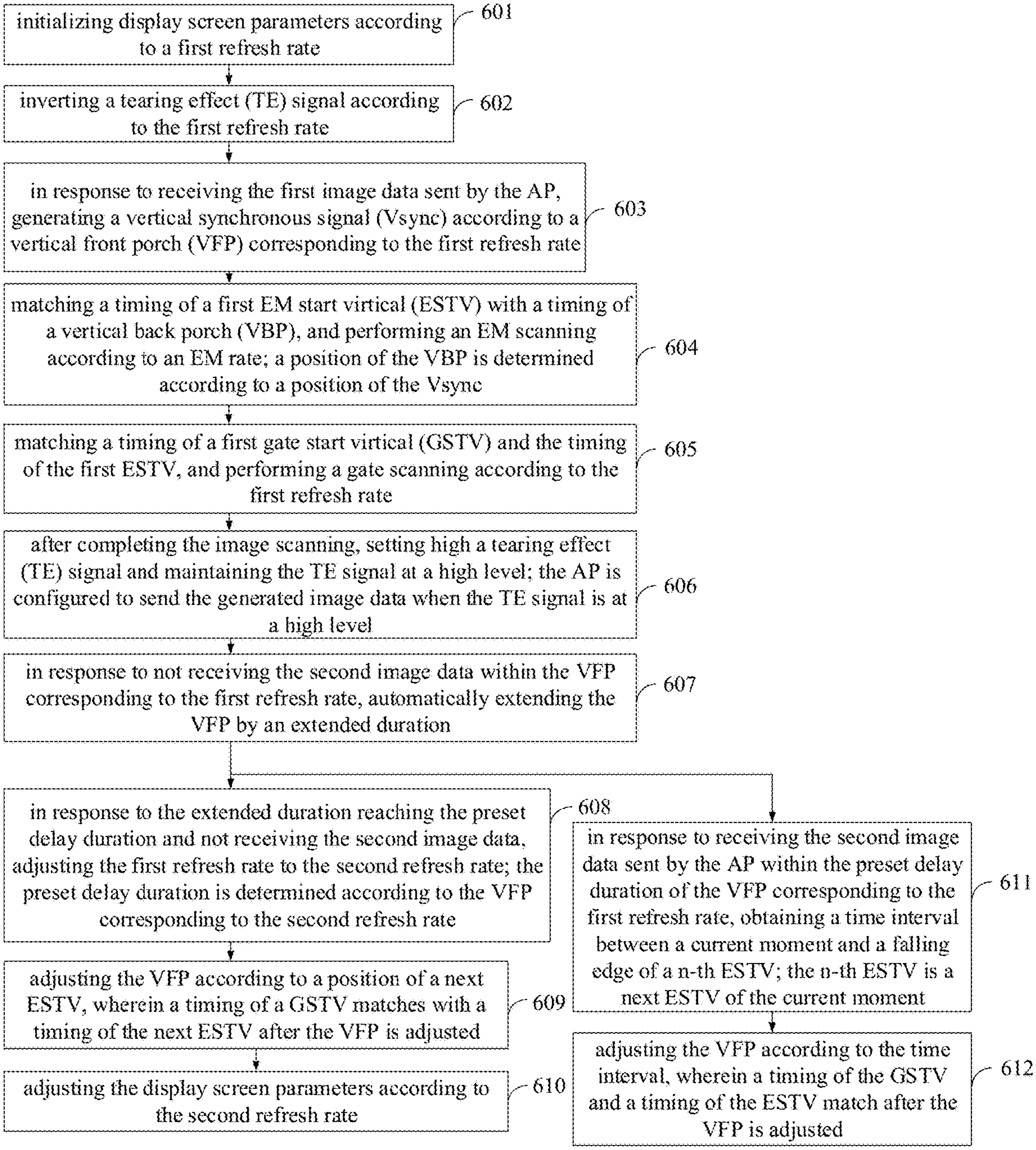
FIG. 6 is a flowchart of a display screen rate conversion method according to another embodiment of the present disclosure.

Referring to FIG. 6, FIG. 6 is a flowchart of a display screen rate conversion method according to another embodiment of the present disclosure. In the embodiment, the method is applied to a DDIC chip of an OLED display screen as an example. The method includes operations at blocks illustrated herein.

At block 601: initializing display screen parameters according to a first refresh rate.

In some embodiments, the DDIC chip takes a maximum refresh rate supported by the OLED display screen as the first refresh rate, and initializes the display screen parameters accordingly.

At block 602: inverting a tearing effect (TE) signal according to the first refresh rate.

In the embodiments, after the initialization of the display screen parameters is completed, the DDIC chip inverts the TE signal according to the first refresh rate, turns down the TE signal during a Vact period (that is, the TE signal remains low during the Vact period), and turns up the TE signal during a Vporch period (that is, the TE signal remains high during the Vporch period).

Correspondingly, the AP performs a TE high-level state detection (after the image data rendering is completed). When the detection indicates that the TE signal is in a high-level state, the image data is sent to the DDIC chip through MIPI; when the detection indicates that the TE signal is in a low-level state, the TE high-level state detection is continued.

In an illustrative example, the DDIC chip inverts the TE signal at 120 Hz.

At block 603: in response to receiving the first image data sent by the AP, generating a vertical synchronous signal (Vsync) according to a vertical front porch (VFP) corresponding to the first refresh rate.

When receiving the first image data sent by the AP, to keep the image rendering consistent with the image display, the DDIC chip generates Vsync according to the first refresh rate, such that the AP performs image rendering according to the Vsync. In some embodiments, since Vsync, VBP, and Vact in Vporch generally remain unchanged, the DDIC chip determines a timing position of Vsync according to the VFP corresponding to the first refresh rate, thereby generating the Vsync.

In an illustrative example, the DDIC chip generates the Vsync according to the VFP corresponding to 120 Hz.

At block 604: matching a timing of a first EM start vertical (ESTV) with a timing of a vertical back porch (VBP), and performing an EM scanning according to an EM frequency; a position of the VBP is determined according to a position of the Vsync.

The EM frequency is an integer multiple of the first refresh rate.

Different from the timing of the EM signal matching the timing of the Gate signal in the related art, in the embodiments, the DDIC chip first performs timing matching on the first ESTV (with VBP), and timing matches the first GSTV (gate start signal) with the first ESTV.

During the timing matching of ESTV, DDIC determines a timing position of VBP according to a timing position of Vsync and a duration of Vsync, and timing matches the first ESTV (closed state) with VBP.

After completing the ESTV timing matching, the DDIC chip performs EM scanning according to the EM frequency and keeps the rate unchanged. In addition, in the embodiments of the present disclosure, the EM frequency is an integer multiple of the refresh rate of the display screen. For example, when the refresh rate of the display screen includes 1 Hz, 30 Hz, 60 Hz, 90 Hz, or 120 Hz, the EM frequency may be 360 Hz.

At block 605: matching a timing of a first gate start vertical (GSTV) and the timing of the first ESTV, and performing a gate scanning according to the first refresh rate.

During the timing matching of GSTV, the DDIC chip timing matches the first GSTV with the first ESTV to meet the EM requirements of the OLED display.

After completing the GSTV timing matching, the DDIC chip performs gate scanning according to the first refresh rate, thereby displaying the image corresponding to the first image data on the OLED display screen. It should be noted that when the gate scanning is started, the DDIC chip turns down the TE signal to prevent the AP from sending image data during the gate scanning; when the gate scanning is completed, the DDIC turns up the TE signal such that the AP can send the prepared image data.

At block 606: after completing the image scanning, setting high a tearing effect (TE) signal and maintaining the TE signal at a high level; the AP is configured to send the generated image data when the TE signal is at a high level.

In the embodiments of the present disclosure, since the AP can only send the prepared image data to the DDIC chip when detecting that the TE signal is at a high level, and the rate conversion process is fully controlled by the DDIC chip in the embodiments of the present disclosure, if the TE signal is still inverted according to the first refresh rate, the issuing of the image data prepared by the AP will be delayed. Therefore, in the embodiments of the present disclosure, after the DDIC chip completes the display of the first image data, the TE signal is set high and maintained at a high level, such that the AP can send the image data in time after preparing the image data.

At block 607: in response to not receiving the second image data within the VFP corresponding to the first refresh rate, automatically extending the VFP by an extended duration.

In some embodiments, while the DDIC chip is waiting for the second image data, a timeout timer is set according to the VFP corresponding to the first refresh rate; when the timeout timer reaches a timer duration, the DDIC chip determines that the AP side rendering rate is lower than the refresh rate of the display and automatically extends the VFP. For example, the DDIC chip sets the timeout timer according to the VFP_120 Hz corresponding to 120 Hz.

In the DDIC chip, the VFP is extended in units of Horizon scanning duration.

When the second image data is not received within the preset delay duration, steps 608 to 610 are performed; when the second image data is received within the preset delay duration, steps 611 to 612 are performed.

At block 608: in response to the extended duration reaching the preset delay duration and not receiving the second image data, adjusting the first refresh rate to the second refresh rate; the preset delay duration is determined according to the VFP corresponding to the second refresh rate.

In some embodiments, to avoid an abnormal display caused by an excessive rate conversion range, the DDIC chip adopts a step-by-step adjustment method to adjust the first refresh rate to the second refresh rate, and the second refresh rate and the first refresh rate are adjacent refresh rates. For example, for a display screen that supports five refresh rates of 1/30/60/90/120 Hz, when the first refresh rate is 120 Hz, the second refresh rate is 90 Hz.

In some embodiments, when the extended duration reaches the preset delay duration, but the DDIC chip still has not received the second image data sent by the AP, the DDIC chip determines that it is necessary to reduce the refresh rate of the display screen in a large range, so as to adjust the first refresh rate to the second refresh rate.

In some embodiments, the accurately calculated extended duration is stored in the DDIC chip. When the VFP is automatically extended, the DDIC chip sets and starts the timer according to the extended duration. Correspondingly, when the second image data is not received within the timer duration, the DDIC chip adjusts the first refresh rate to the second refresh rate.

In some embodiments, for a display screen that supports five refresh rates of 1/30/60/90/120 Hz, the DDIC chip stores a first VFP extended duration, a second VFP extended duration, a third VFP extended duration, and a fourth VFP extended duration. The first VFP extended duration is calculated according to the VFP corresponding to 90 Hz and 120 Hz (such as VFP_90 Hz-VFP_120 Hz), and the second VFP extended duration is calculated according to the VFP corresponding to 60 Hz and 90 Hz (such as VFP_60 Hz-VFP_90 Hz)), the third VFP extended duration is calculated according to the VFP corresponding to 60 Hz and 30 Hz (for example, VFP_30 Hz-VFP_60 Hz), and the fourth VFP extended duration is calculated according to the VFP corresponding to 1 Hz and 30 Hz (for example, VFP_1 Hz-VFP_30 Hz).

Correspondingly, when the second image frame data is not received within VFP_120 Hz, the DDIC chip sets a first timer according to the first VFP extended duration. When the second image frame data is not received within the timer duration of the first timer, the refresh rate of the display screen is adjusted from 120 Hz to 90 Hz, and a second timer is set according to the second VFP extended duration. When the second image frame data is not received within the timer duration of the second timer, the refresh rate of the display screen is adjusted from 90 Hz to 60 Hz, and so on, until it is adjusted to the minimum refresh frequency (in case no second image data is ever received).

At block 609: adjusting the VFP according to a position of a next ESTV, wherein a timing of a GSTV matches with a timing of the next ESTV after the VFP is adjusted.

In order to avoid the influence of rate conversion on the screen, while adjusting the refresh rate, the DDIC chip still needs to keep the timing matching between GSTV and ESTV. In some embodiments, the DDIC chip adjusts the duration of the VFP according to the position of the next ESTV, such that the timing of the adjusted GSTV matches the timing of the next ESTV.

At block 610: adjusting the display screen parameters according to the second refresh rate.

For the implementation of this step, reference may be made to the above step 404, which will not be repeated in the embodiments. In addition, there is no strict time sequence relationship between this step and step 609, that is, step 609 may be performed together with step 610, which is not limited herein.

At block 611: in response to receiving the second image data sent by the AP within the preset delay duration of the VFP corresponding to the first refresh rate, obtaining a time interval between a current moment and a falling edge of a n-th ESTV; the n-th ESTV is a next ESTV of the current moment.

When the second image data issued by the AP is received within the delay duration of the VFP, it is indicated that the AP rendering has a small delay, that is, there is no need to adjust the refresh rate of the display screen. In this case, to meet the strict requirements of the display screen for EM, the DDIC chip obtains the time interval (EM_Distance) between the current moment (that is, the moment when the second image data is received) and the falling edge of the next ESTV, such that the VFP can be subsequently adjusted based on this time interval.

It should be noted that the DDIC chip needs to turn down the TE when obtaining the time interval.

At block 612: adjusting the VFP according to the time interval, wherein a timing of the GSTV and a timing of the ESTV match after the VFP is adjusted.

In order to enable the timing of GSTV to match the timing of ESTV, the DDIC chip needs to adjust the VFP duration such that the timing of GSTV and ESTV match, thereby controlling the display screen to update the image according to the second image data.

In some embodiments, this step may include the following sub-steps.

1. Obtaining a sum of durations of VFP, Vsync, and VBP corresponding to the first refresh rate.

In some embodiments, when adjusting the VFP, the DDIC chip obtains the respective durations of VFP, Vsync, and VBP corresponding to the first refresh rate, and calculates the sum of the durations of the three (VFP+Vsynsc+VBP).

Further, the DDIC chip detects whether the time interval is greater than the sum of the durations. When the time interval is greater than the sum of the durations, it is indicated that the image update preparation can be completed before the next ESTV, and step 2 is performed; when the time interval is less than the sum of the durations, it is indicated that the image update preparation cannot be completed before the next ESTV, and step 3 is performed.

2. In response to the time interval being greater than the sum of the durations, performing a first method to adjust the VFP, wherein after the first method is performed to adjust the VFP, the timing of the GSTV matches the timing of the n-th ESTV.

When EM_Distance≥VFP+Vsynsc+VBP, the DDIC chip adjusts the VFP duration such that the timing of the adjusted GSTV matches the timing of the next ESTV.

3. In response to the time interval being less than the sum of the durations, performing a second method to adjust the VFP; wherein after the second method is performed to adjust the VFP, the timing of the GSTV matches the timing of the n+1th ESTV.

When EM_Distance<VFP+Vsynsc+VBP, the DDIC chip determines that it needs to delay one EM signal period, so as to adjust the VFP duration such that the timing of the adjusted GSTV matches the timing of the next ESTV.

It should be noted that since the small-range rate conversion has a small impact on Gamma and Demura (negligible), while adjusting the VFP through the above steps 611 and 612, the refresh rate of the display screen may be kept unchanged.

In the embodiments, the DDIC chip automatically adjusts the refresh frequency of the display screen downward to reduce power consumption when it recognizes that there is a large range of delay in the image rendering rate on the AP side through the VFP delay mechanism; and when it recognizes that there is a small range of delay in the image rendering rate on the AP side, the DDIC chip maintains the current refresh rate and adjusts the VFP to ensure that the GSTV and ESTV timings match, such that the DDIC chip can be compatible with both small-range and large-range rate conversion, expanding the application scenario of adaptive rate conversion.

In the above embodiments, the DDIC chip automatically reduces the display refresh rate to reduce power consumption when the display refresh frequency is greater than the image rendering rate on the AP side. In other possible application scenarios, when the display refresh rate is less than the image rendering rate on the AP side, the DDIC chip needs to automatically increase the rate in order to improve the smoothness of the screen display.

In some embodiments, after the DDIC chip adjusts the display screen parameters according to the second refresh rate, when the third image data sent by the AP is received within the VFP corresponding to the first refresh rate, the second refresh rate is adjusted to the first refresh rate, and the display screen parameters are adjusted according to the first refresh rate.

Among them, a boosting delay of the DDIC chip is related to the EM frequency. When the EM frequency is 480 Hz, the boosting delay is 2.1 ms; and when the EM frequency is 360 Hz, the boosting delay is 2.8 ms, which can achieve the effect of real-time rate boosting.

For example, after the DDIC chip lowers the refresh rate of the display screen from 120 Hz to 90 Hz, when the third image data sent by the AP is received within VFP_120 Hz (less than VFP_90 Hz), it is indicated that the rendering rate on the AP side has increased. Correspondingly, the DDIC chip boosts the display by adjusting the refresh rate from 90 Hz to 120 Hz, making the image refresh rate match the image rendering rate and improving the smoothness of the screen.

Figure 7:
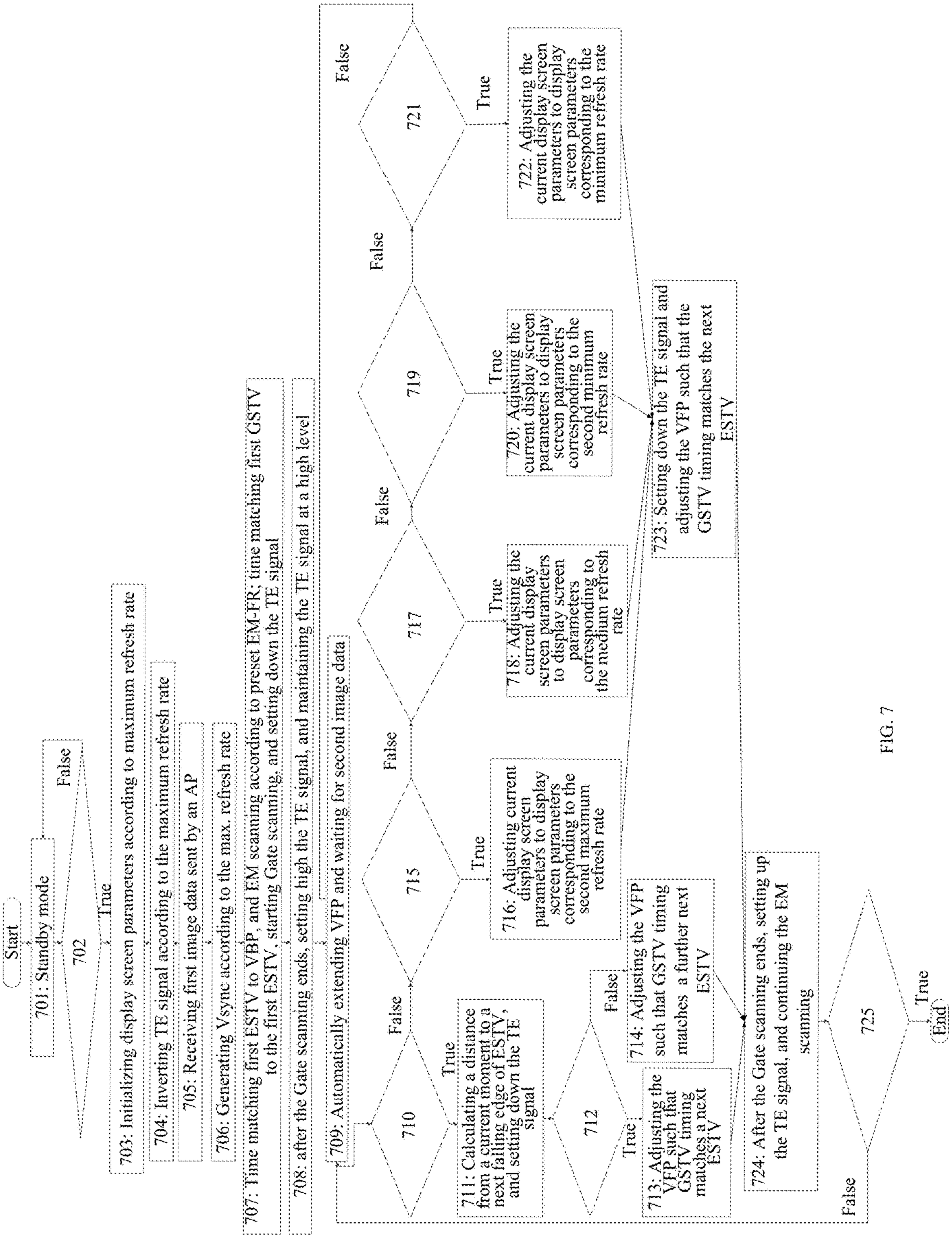
FIG. 7 is a flowchart of a display screen rate conversion process according to an embodiment of the present disclosure.

In an illustrative example, for an AMOLED display with five refresh rates of 1/30/60/90/120 Hz and an EM frequency of 360 Hz, as shown in FIG. 7, the dynamic rate conversion process of the DDIC chip includes the following steps.

At block 701: Entering a standby mode.

At block 702: Detecting whether a sleep-out or a power-on command is received; when the sleep-out command or the power-on command is detected to be received, step 703 is performed; when the sleep-out command or the power-on command is not detected to be received, step 701 is performed.

At block 703: Initializing display screen parameters (such as Gamma_120 Hz and Demura 120 Hz) according to a maximum refresh rate (such as 120 Hz).

At block 704: Inverting a TE signal according to the initialized maximum refresh rate.

At block 705: Receiving first image data sent by an AP.

At block 706: Generating a Vsync according to the maximum refresh rate.

At block 707: Matching a timing of a first ESTV to a timing of a VBP, and performing an EM scanning according to a preset EM-FR (such as 360 Hz); matching a timing of a first GSTV to a timing of the first ESTV, starting a Gate scanning, and setting down the TE signal.

At block 708: after the Gate scanning ends (that is, after Vact), setting high the TE signal, and maintaining the TE signal at a high level.

At block 709: Automatically extending a VFP and waiting for second image data.

At block 710: Detecting whether receiving the second image data within a delay duration of the VFP; when the second image data is received within the delay duration of the VFP, performing step 711; when the second image data is not received within the delay duration of the VFP, performing step 715.

At block 711: Calculating a distance EM_Distance from a current moment to a next falling edge of ESTV, and setting down the TE signal.

At block 712: Detecting whether the EM_Distance is greater than or equal to a sum of VFP+Vsync+VBP; when the EM_Distance is greater than or equal to the sum, performing step 713; when the EM_Distance is less than the sum, performing step 714.

At block 713: Adjusting the VFP such that a timing of GSTV matches a timing of a next ESTV.

At block 714: Adjusting the VFP such that the timing of GSTV matches a timing of a further next ESTV.

At block 715: Detecting whether receiving the second image data within the delay duration of the VFP corresponding to a second maximum refresh rate (for example, 90 Hz); when the second image data is received within the delay duration of the VFP corresponding to the second maximum refresh rate, performing step 716; when the second image data is not received within the delay duration of the VFP corresponding to the second maximum refresh rate, performing step 717.

At block 716: Adjusting current display screen parameters to display screen parameters (such as Gamma_90 Hz and Demura_90 Hz) corresponding to the second maximum refresh rate (such as 90 Hz).

At block 717: Detecting whether receiving the second image data within the delay duration of the VFP corresponding to a medium refresh rate (for example, 60 Hz); when the second image data is received within the delay duration of the VFP corresponding to the medium refresh rate, performing step 718; when the second image data is not received within the delay duration of the VFP corresponding to the medium refresh rate, performing step 719.

At block 718: Adjusting the current display screen parameters to display screen parameters (such as Gamma_60 Hz and Demura_60 Hz) corresponding to the medium refresh rate (such as 60 Hz).

At block 719: Detecting whether receiving the second image data within the delay duration of the VFP corresponding to a second minimum refresh rate (for example, 30 Hz); when the second image data is received within the delay duration of the VFP corresponding to the second minimum refresh rate, performing step 720; when the second image data is not received within the delay duration of the VFP corresponding to the second minimum refresh rate, performing step 721.

At block 720: Adjusting the current display screen parameters to display screen parameters (such as Gamma_30 Hz and Demura_30 Hz) corresponding to the second minimum refresh rate (such as 30 Hz).

At block 721: Detecting whether receiving the second image data within the delay duration of the VFP corresponding to a minimum refresh rate (for example, 1 Hz); when the second image data is received within the delay duration of the VFP corresponding to the minimum refresh rate, performing step 722; when the second image data is not received within the delay duration of the VFP corresponding to the minimum refresh rate, performing step 709.

At block 722: Adjusting the current display screen parameters to display screen parameters (such as Gamma_1 Hz and Demura_1 Hz) corresponding to the minimum refresh rate (such as 1 Hz).

At block 723: Setting down the TE signal and adjusting the VFP such that the timing of the GSTV matches the timing of the next ESTV.

At block 724: After the Gate scanning ends (that is, after Vact), setting up the TE signal, and continuing the EM scanning.

At block 725: Detecting whether receiving a power-off command or a sleep-in command; when the power-off command or sleep-in command is received, ending the process; and when the power-off command or sleep-in command is not received, performing cyclically the step 709.

It should be noted that the embodiments of the present disclosure only use the display screen with five variable rate gears, the corresponding Gate-FR is 1/30/60/90/120 Hz, and the EM-FR is 360 Hz as an example for schematic illustration. In other possible implementations, the display screen may also be set to three, four or more than five variable rate gears (for example, set the 15 Hz gear between 1 Hz and 30 Hz), ensuring that EM-FR is an integer multiple of Gate-FR. The embodiments of the present disclosure do not limit the number of variable rate gears, the rates of Gate-FR and EM-FR.

In a scene where the refresh rate is stable (such as a video playing scene, the refresh rate is stable at 48 Hz), to ensure the display quality of the screen, it is necessary to ensure that the EM-FR is an integer multiple of the Gate-FR. However, due to the wide rate-conversion range of the OLED display (especially for LTPO AMOLED displays), DDIC chips cannot guarantee that EM-FR is an integer multiple of all Gate-FR (for example, 360 Hz EM-FR is not an integer multiple of 48 Hz Gate-FR).

In order to solve the above problem, in the embodiments of the present disclosure, the AP issues an EM frequency conversion command to the DDIC chip when the EM-FR is not an integer multiple of the current refresh rate according to the refresh rate of the image in the current scene and the EM-FR of the DDIC chip, instructing the DDIC chip to adjust the EM-FR to ensure that the adjusted EM-FR is an integer multiple of the current refresh rate (i.e., Gate-FR).

Figure 8:
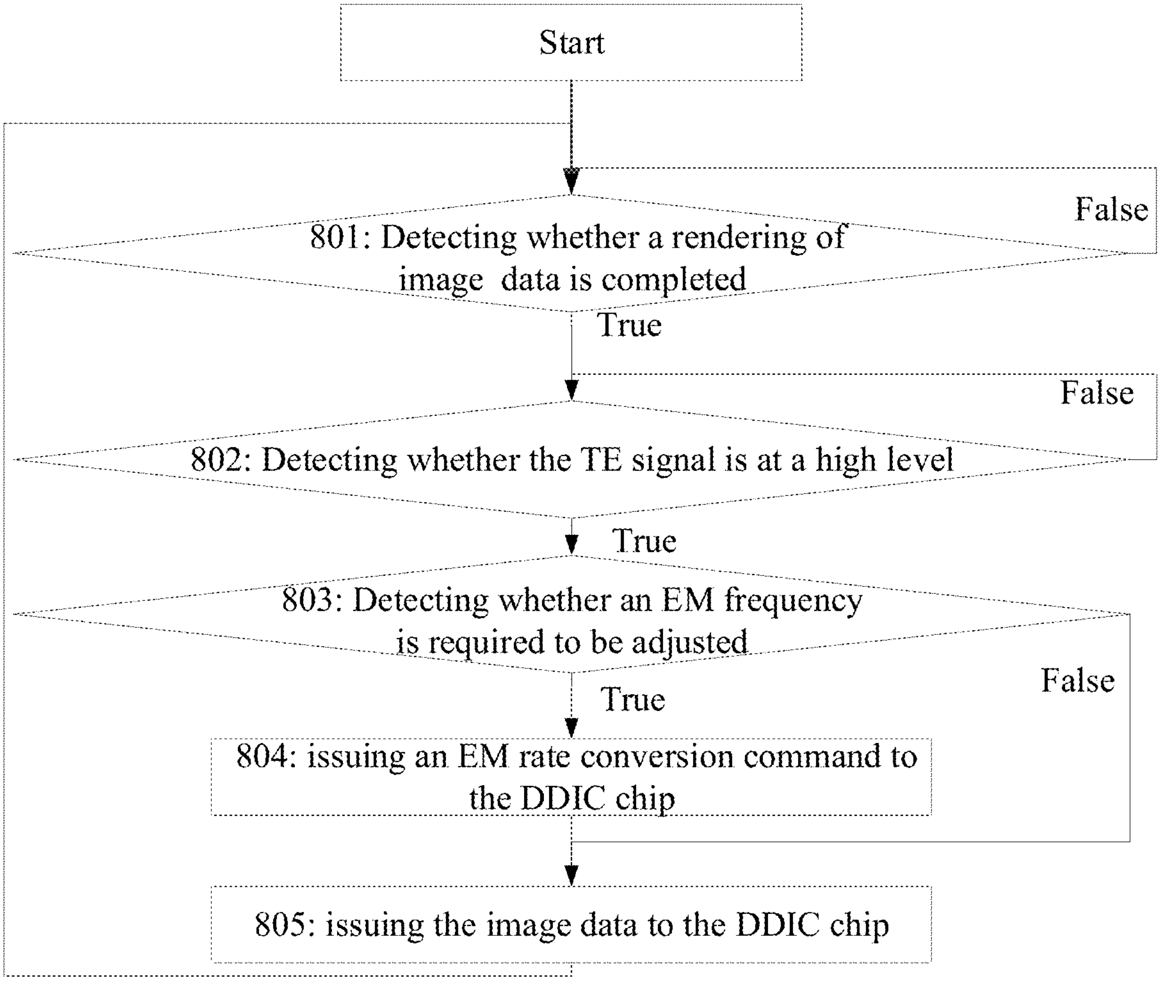
FIG. 8 is a flowchart of an AP issuing an EM frequency conversion command to a DDIC chip according to an embodiment of the present disclosure.

Schematically, the process of the AP issuing the EM frequency conversion command to the DDIC chip is shown in FIG. 8.

At block 801: Detecting whether a rendering of image data is completed.

Different from the related art, after the AP detects a rising edge of the TE signal, it detects whether the image data is rendered (frame buffer ready). In the embodiment, the AP first detects whether the image data is rendered. When the rendering is completed, step 802 is performed; when the rendering is not completed, step 801 is performed again.

At block 802: Detecting whether the TE signal is at a high level.

Different from the related art, when the AP detects the rising edge of the TE signal, it sends image data to the DDIC chip. In the embodiment, the DDIC chip will keep the TE signal at a high level during the Vporch period. Correspondingly, the AP determines whether to send the image data to the DDIC chip by detecting the level state of the TE signal. When the TE signal is detected to be at a high level, step 803 is performed; when the TE signal is detected to be at a low level, step 802 is performed again.

At block 803: Detecting whether an EM frequency is required to be adjusted.

In some embodiments, the AP obtains the refresh rate of the image in the current scene and the current EM frequency of the DDIC chip. When the EM frequency is an integer multiple of the refresh rate, it is determined that there is no need to adjust the EM frequency, and step 805 is performed; when the EM frequency is not an integer multiple of the refresh rate, it is determined that the EM frequency needs to be adjusted, and step 804 is performed.

At block 804: issuing an EM frequency conversion command to the DDIC chip.

The EM frequency conversion command may be issued through MIPI.

In some embodiments, the EM frequency conversion command issued by the AP includes the current refresh rate. Correspondingly, the DDIC chip receives the EM frequency conversion command issued by the AP, and adjusts the EM frequency according to the refresh rate contained in the EM frequency conversion command, thereby ensuring that the adjusted EM frequency is an integer multiple of the current refresh rate.

It should be noted that when the DDIC chip adjusts the EM frequency, it keeps the EM duty cycle (EM-Duty) unchanged, so as to avoid sudden changes in the brightness of the display before and after the EM frequency adjustment.

In an illustrative example, when the current refresh rate is 48 Hz, the DDIC chip adjusts the EM frequency from 360 Hz to 480 Hz.

At block 805: issuing the image data to the DDIC chip.

Further, the AP sends the rendered image data to the DDIC chip through MIPI, such that the DDIC chip controls the display screen to refresh the image.

In the embodiments, the AP sends the EM frequency conversion command to the DDIC chip, and the DDIC chip adjusts the EM frequency according to the EM frequency conversion command, such that the adjusted EM frequency is an integer multiple of the current refresh rate to ensure the stability of the image display in each scene.

In the embodiments shown in FIG. 6, the DDIC chip instructs the AP to issue the generated image data by setting the TE signal high. In another possible implementation manner, the DDIC chip may instruct the AP to issue the generated image data by means of a high-frequency inversion of the TE signal.

Figure 9:
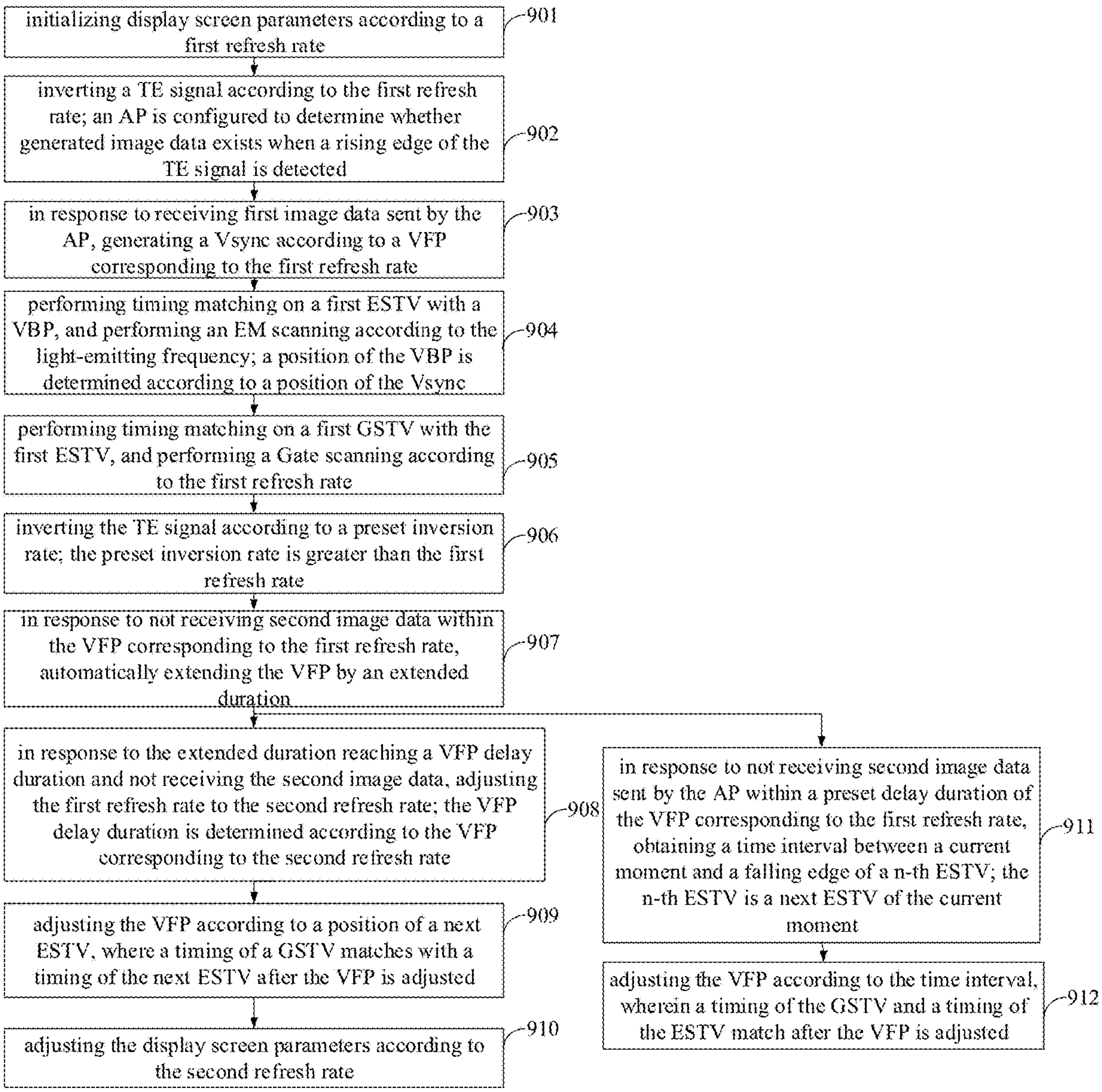
FIG. 9 is a flowchart of a display screen rate conversion method according to further another embodiment of the present disclosure.

Referring to FIG. 9, FIG. 9 is a flowchart of a display screen rate conversion method according to further another embodiment of the present disclosure. In the embodiments, the method is applied to a DDIC chip of an OLED display screen as an example. The method includes operations at blocks illustrated herein.

At block 901: initializing display screen parameters according to a first refresh rate.

At block 902: inverting a TE signal according to the first refresh rate; an AP is configured to determine whether generated image data exists when a rising edge of the TE signal is detected.

In the embodiments, after the initialization of the display screen parameters is completed, the DDIC chip inverts the TE signal according to the first refresh rate, sets the TE signal low during the Vact period (that is, the TE signal remains low during the Vact period), and sets the TE signal high during the Vporch period (that is, the TE signal remains high during Vporch period).

Correspondingly, the AP detects the rising edge of TE (that is, the TE signal is set high). When the rising edge of TE is detected, the AP further detects whether the image data is ready, and when the preparation is complete, it sends the image data to the DDIC chip through MIPI; when the rising edge of TE is detected while the image data is not ready, the AP continues to detect the rising edge; until the rising edge is detected and the image data is ready, the AP sends the image data to the DDIC chip.

In an illustrative example, the DDIC chip inverts the TE signal at 120 Hz.

At block 903: in response to receiving first image data sent by the AP, generating a Vsync according to a VFP corresponding to the first refresh rate.

At block 904: performing timing matching on a first ESTV with a VBP, and performing an EM scanning according to the light-emitting frequency; a position of the VBP is determined according to a position of the Vsync.

At block 905: performing timing matching on a first GSTV with the first ESTV, and performing a Gate scanning according to the first refresh rate.

For the implementation manner of the above steps 903 to 905, reference may be made to steps 603 to 605, and details are not described herein again in these embodiments.

At block 906: inverting the TE signal according to a preset inversion rate; the preset inversion rate is greater than the first refresh rate.

Since the AP can only send the prepared image data to the DDIC chip when the rising edge of TE is detected, and in the embodiments, the rate conversion process is fully controlled by the DDIC chip, when the TE signal is still inverted according to the first refresh rate, the issuing of the prepared image data by the AP will cause delays (for example, in a case where the image data is not ready when the first rising edge of TE is detected, and the image data is ready within a short time after the first rising edge of TE, when the TE signal is inverted at the first refresh rate, the prepared image data needs to be issued on the next rising edge of TE, and the delay is relatively high). Therefore, in the embodiments of the present disclosure, after the DDIC chip completes the display of the first image data, the TE signal is controlled to be inverted according to the preset inversion rate, thereby increasing the rate at which the AP side detects the rising edge of TE.

In some embodiments, the preset inversion rate is preset and greater than the first refresh rate. For example, a PWM square wave with a preset inversion rate of 2000 Hz and a duty cycle of 50%.

By increasing the inversion rate of the TE signal, the time for the AP to upload image data is increased, such that the image data rendered by the AP may be delivered to the DDIC chip with a less delay, and the image display rate is increased.

At block 907: in response to not receiving second image data within the VFP corresponding to the first refresh rate, automatically extending the VFP by an extended duration.

At block 908: in response to the extended duration reaching a VFP delay duration and not receiving the second image data, adjusting the first refresh rate to the second refresh rate; the VFP delay duration is determined according to the VFP corresponding to the second refresh rate.

At block 909: adjusting the VFP according to a position of a next ESTV, where a timing of a GSTV matches with a timing of the next ESTV after the VFP is adjusted.

At block 910: adjusting the display screen parameters according to the second refresh rate.

At block 911: in response to not receiving second image data sent by the AP within a preset delay duration of the VFP corresponding to the first refresh rate, obtaining a time interval between a current moment and a falling edge of a n-th ESTV; the n-th ESTV is a next ESTV of the current moment.

At block 912: adjusting the VFP according to the time interval, wherein a timing of the GSTV and a timing of the ESTV match after the VFP is adjusted.

For the implementation of the above steps 907 to 912, reference may be made to steps 607 to 612, which will not be repeated in these embodiments.

Figure 10:
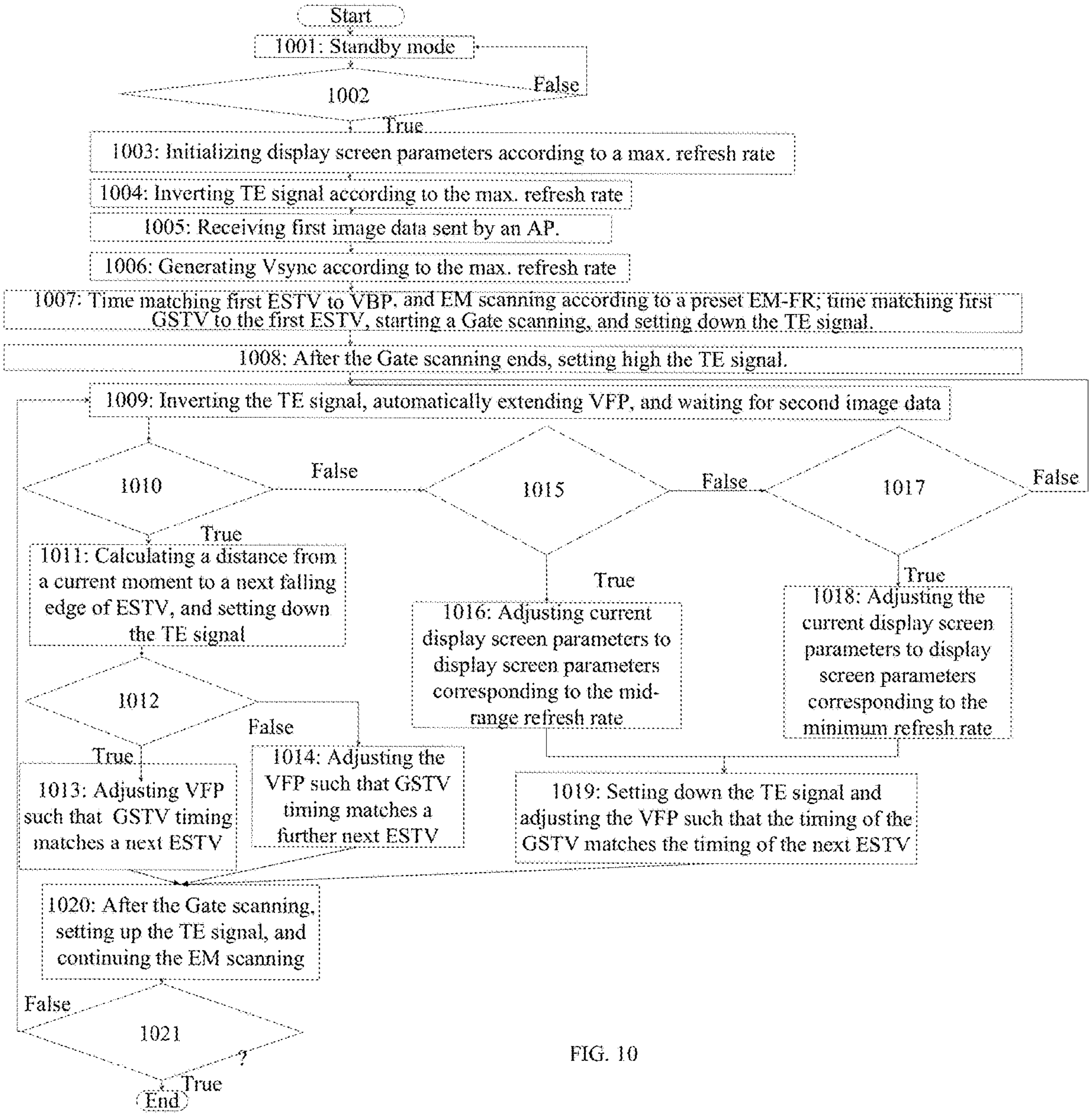
FIG. 10 is a flowchart of a display screen rate conversion process according to another embodiment of the present disclosure.

In some embodiments, for an AMOLED display screen with three refresh rates of 60/90/120 Hz and an EM frequency of 360 Hz, as shown in FIG. 10, the process of dynamic rate conversion of the DDIC chip includes the following steps.

At block 1001: Entering a standby mode.

At block 1002: Detecting whether a sleep-out command or a power-on command is received; when the sleep-out command or the power-on command is detected to be received, step 1003 is performed; when the sleep-out command or the power-on command is not detected to be received, step 1001 is performed.

At block 1003: Initializing display screen parameters (such as Gamma_120 Hz and Demura_120 Hz) according to a maximum refresh rate (such as 120 Hz).

At block 1004: Inverting a TE signal according to the initialized maximum refresh rate.

At block 1005: Receiving first image data sent by an AP.

At block 1006: Generating a Vsync according to the maximum refresh rate.

At block 1007: Matching a timing of a first ESTV to a timing of a VBP, and performing an EM scanning according to a preset EM-FR (such as 360 Hz); matching a timing of a first GSTV to a timing of the first ESTV, starting a Gate scanning, and setting down the TE signal.

At block 1008: After the Gate scanning ends, setting high the TE signal.

At block 1009: Inverting the TE signal according to a preset inversion rate and a duty cycle (for example, 2000 Hz/50% duty cycle), automatically extending a VFP, and waiting for second image data.

At block 1010: Detecting whether receiving the second image data within a delay duration of the VFP; when the second image data is received within the delay duration of the VFP, performing step 1011; when the second image data is not received within the delay duration of the VFP, performing step 1015.

At block 1011: Calculating a distance EM_Distance from a current moment to a next falling edge of ESTV, and setting down the TE signal.

At block 1012: Detecting whether the EM_Distance is greater than or equal to a sum of VFP+Vsync+VBP; when the EM_Distance is greater than or equal to the sum, performing step 1013; when the EM_Distance is less than the sum, performing step 1014.

At block 1013: Adjusting the VFP such that a timing of GSTV matches a timing of a next ESTV.

At block 1014: Adjusting the VFP such that the timing of GSTV matches a timing of a further next ESTV.

At block 1015: Detecting whether receiving the second image data within the delay duration of the VFP corresponding to a mid-range refresh rate (for example, 90 Hz); when the second image data is received within the delay duration of the VFP corresponding to the mid-range refresh rate, performing step 1016; when the second image data is not received within the delay duration of the VFP corresponding to the mid-range refresh rate, performing step 1017.

At block 1016: Adjusting current display screen parameters to display screen parameters (such as Gamma_90 Hz and Demura_90 Hz) corresponding to the mid-range refresh rate (such as 90 Hz).

At block 1017: Detecting whether receiving the second image data within the delay duration of the VFP corresponding to a minimum refresh rate (for example, 60 Hz); when the second image data is received within the delay duration of the VFP corresponding to the minimum refresh rate, performing step 718; when the second image data is not received within the delay duration of the VFP corresponding to the minimum refresh rate, performing step 709.

At block 1018: Adjusting the current display screen parameters to display screen parameters (such as Gamma_60 Hz and Demura_60 Hz) corresponding to the minimum refresh rate (such as 60 Hz).

At block 1019: Setting down the TE signal and adjusting the VFP such that the timing of the GSTV matches the timing of the next ESTV.

At block 1020: After the Gate scanning ends, setting up the TE signal, and continuing the EM scanning.

At block 1021: Detecting whether receiving a power-off command or a sleep-in command; when the power-off command or sleep-in command is received, ending the process; and when the power-off command or sleep-in command is not received, performing cyclically the step 1009.

It should be noted that the embodiments of the present disclosure only use the display screen with three rate conversion gears, the corresponding Gate-FR is 120/90/60 Hz, and the EM-FR is 360 Hz as an example for schematic illustration. In other possible implementations, the display screen may also be set with two, three or more variable rate gears. Correspondingly, another Gate-FR (such as 30 Hz, 45 Hz, etc.) other than 120/90/60 Hz may also be used, ensuring that EM-FR is an integer multiple of Gate-FR. The embodiments of the present disclosure do not limit the number of variable rate gears, the rates of Gate-FR and EM-FR.

In general, as shown in Table 1, the embodiments of the present disclosure have the following differences and advantages compared with the display rate conversion solution in the related art.

Of course, the method provided in the embodiments of the present disclosure may be applied to other non-battery-powered terminals, such as a TV, a monitor, or a personal computer, etc., which is not limited in the embodiments of the present disclosure.

The embodiments of the present disclosure further provide a DDIC chip applied to an OLED display screen, and the DDIC chip is configured to perform the operations as followed.

Initializing display screen parameters according to a first refresh rate.

In response to receiving first image data sent by an application processor (AP), performing an image scanning according to the first refresh rate.

In response to not receiving second image data sent by the AP within a preset delay duration of a vertical front porch (VFP) corresponding to the first refresh rate, adjusting the first refresh rate to a second refresh rate; the second refresh rate is less than the first refresh rate.

Adjusting the display screen parameters according to the second refresh rate.

In some embodiments, the DDIC chip is further configured to perform the operations as followed.

TABLE I

| | Rate conversion solution in the related art | Rate conversion solution in the present disclosure |
|---|---|---|
| Implementation manner | The AP sends a rate conversion-related command, and the DDIC chip carries out rate conversion passively according to the command. | The AP does not need to send a rate conversion-related command, the DDIC chip carries out rate conversion adaptively and actively. |
| Boosting rate | Passive execution by the DDIC chip, with high delay (requiring the end of the current frame to boost rate; when the refresh rate is 10 Hz, the maximum delay is 91.7 ms) | Adaptive matching by the DDIC chip, with low delay (real time response, delay of 2.1 ms at EM frequency of 480 Hz, delay of 2.8 ms at EM frequency of 360 Hz) |
| Reducing rate | Passive execution by the DDIC chip | The DDIC chip adaptive matches AP rendering rate, reducing to the minimum refresh rate when no new image date is generated. |
| Small-range rate conversion | The AP calculates Timeout and issues the command, and the DDIC chip passively executes (not compatible with large-range rate conversion). | The AP does not need to calculate Timeout and issue commands, and the DDIC chip adaptive matches (fully compatible with large-range rate conversion). |
| Rate conversion range | 24 Hz to 120 Hz (Current DDIC chip maximum range) | Unlimited |
| Gate & EM matching | EM follows Gate | Gate follows EM |
| Power consumption | High | Low |

In some embodiments, the method provided in the embodiments of the present disclosure is applied to a mobile terminal, that is, the DDIC chip of the OLED display screen in the mobile terminal executes the above-mentioned display rate conversion method. Since the mobile terminal is usually powered by a battery, and the battery power is limited (which is more sensitive to power consumption), in cases where the method provided by the embodiments of the present disclosure is applied to the mobile terminal, the display quality of the mobile terminal may be improved while reducing the mobile terminal's power consumption. The mobile terminal may include a smart phone, a tablet computer, a wearable device (such as a smart watch), a portable personal computer, etc. The embodiments of the present disclosure do not limit the specific type of the mobile terminal.

Generating a vertical synchronous signal (Vsync) according to the VFP corresponding to the first refresh rate.

Matching a timing of a first EM start vertical (ESTV) with a timing of a vertical back porch (VBP), and performing an EM scanning according to an EM frequency; a position of the VBP is determined according to a position of the Vsync.

Matching a timing of a first gate start vertical (GSTV) and the timing of the first ESTV, and performing a gate scanning according to the first refresh rate.

In some embodiments, the DDIC chip is further configured to perform the operations as followed.

In response to not receiving the second image data within the VFP corresponding to the first refresh rate, automatically extending the VFP by an extended duration.

In response to the extended duration reaching the preset delay duration and not receiving the second image data, adjusting the first refresh rate to the second refresh rate; the preset delay duration is determined according to the VFP corresponding to the second refresh rate.

In some embodiments, the DDIC chip is further configured to perform the operations as followed.

Adjusting the VFP according to a position of a next ESTV, wherein a timing of a GSTV matches with a timing of the next ESTV after the VFP is adjusted.

In some embodiments, the DDIC chip is further configured to perform the operations as followed.

After completing the image scanning, setting high a tearing effect (TE) signal and maintaining the TE signal at a high level; the AP is configured to send the generated image data when the TE signal is at a high level.

In some embodiments, the DDIC chip is further configured to perform the operations as followed.

Inverting a TE signal according to the first refresh rate; the AP is configured to determine whether the generated image data exists in response to detecting a rising edge of the TE signal.

After performing the image scanning according to the first refresh rate, the method further includes operations as followed.

Inverting the TE signal according to a preset inversion rate; the preset inversion rate is greater than the first refresh rate.

In some embodiments, the DDIC chip is further configured to perform the operations as followed.

Receiving an EM frequency conversion command issued by AP.

Adjusting the EM frequency according to the EM frequency conversion command; the adjusted EM frequency is an integer multiple of a current refresh rate.

In some embodiments, the DDIC chip is further configured to perform the operations as followed.

In response to receiving third image data sent by the AP within the VFP corresponding to the first refresh rate, adjusting the second refresh rate to the first refresh rate.

Adjusting the display screen parameters according to the first refresh rate.

In some embodiments, the first refresh rate is a maximum refresh rate of the OLED display screen.

In some embodiments, the DDIC chip is further configured to perform the operations as followed.

Adjusting the first refresh rate to the second refresh rate in a step-by-step manner; the second refresh rate and the first refresh rate are adjacent refresh rates in terms of values.

In some embodiments, the DDIC chip is a DDIC chip of an OLED display screen in a mobile terminal.

The embodiments of the application further provide a DDIC chip applied to an OLED display screen, and the DDIC chip is configured to perform the operations as followed.

Initializing display screen parameters according to a first refresh rate.

In response to receiving first image data sent by an application processor (AP), performing an image scanning according to the first refresh rate.

In response to receiving second image data sent by the AP within a preset delay duration of a VFP corresponding to the first refresh rate, obtaining a time interval between a current moment and a falling edge of a n-th ESTV; the n-th ESTV is a next ESTV of the current moment.

Adjusting the VFP according to the time interval, wherein a timing of the GSTV and a timing of the ESTV match after the VFP is adjusted.

In some embodiments, the DDIC chip is further configured to perform the operations as followed.

Generating a vertical synchronous signal (Vsync) according to the VFP corresponding to the first refresh rate.

Matching a timing of a first ESTV with a timing of a vertical back porch (VBP), and performing an EM scanning according to an EM frequency; a position of the VBP is determined according to a position of the Vsync.

Matching a timing of a first GSTV and the timing of the first ESTV, and performing a gate scanning according to the first refresh rate.

In some embodiments, the DDIC chip is further configured to perform the operations as followed.

Obtaining a sum of durations of VFP, Vsync, and VBP corresponding to the first refresh rate.

In response to the time interval being greater than the sum of the durations, performing a first method to adjust the VFP, wherein after the first method is performed to adjust the VFP, the timing of the GSTV matches the timing of the n-th ESTV.

In response to the time interval being less than the sum of the durations, performing a second method to adjust the VFP; wherein after the second method is performed to adjust the VFP, the timing of the GSTV matches the timing of the n+1th ESTV.

For the detailed process of the DDIC chip implementing the display rate conversion method, reference may be made to the foregoing method embodiments, which will not be repeated herein.

In addition, the embodiments of the present disclosure further provide a display module, the display module includes an AMOLED display screen and a DDIC chip, the DDIC chip is configured to drive the AMOLED display screen and to implement the display rate conversion method provided in the foregoing method embodiments.

Figure 11:
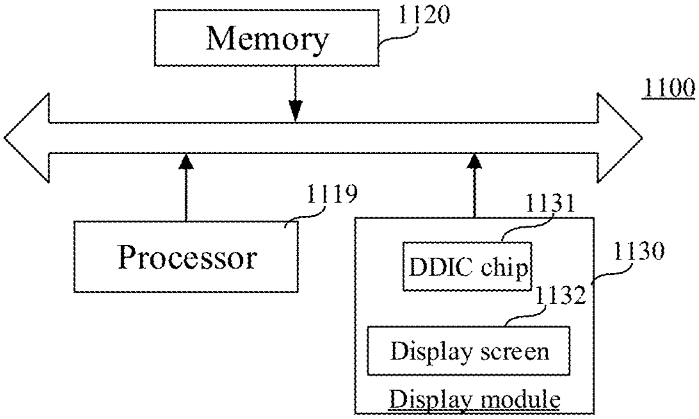
FIG. 11 is a structural block view of a terminal according to an embodiment of the present disclosure.

Referring to FIG. 11, FIG. 11 is a structural block view of a terminal according to an embodiment of the present disclosure. The terminal 1100 may be a smart phone, a tablet computer, a notebook computer, or the like. The terminal 1100 in the present disclosure may include one or more of the following components: a processor 1110, a memory 1120, and a display module 1130.

The processor 1110 may include one or more processing cores. The processor 1110 utilizes various interfaces and lines to connect various parts within the terminal 1100 to perform various functions and process data of the terminal 1100 by running or executing command, programs, code sets, or command sets stored in the memory 1120, and by calling data stored in the memory 1120. In some embodiments, the processor 1110 may be implemented in at least one of the hardware forms of Digital Signal Processing (DSP), Field-Programmable Gate Array (FPGA), and Programmable Logic Array (PLA). The processor 1110 may integrate one or a combination of a Central Processing Unit (CPU), a Graphics Processing Unit (GPU), a Neural-network Processing Unit (NPU), and a modem. Among them, the CPU mainly handles the operating system, user interface, applications, etc.; the GPU is configured to render and draw the content to be displayed by the touch display module 1130; the NPU is configured to implement artificial intelligence (AI) functions; and the modem is configured to handle wireless communications. It can be understood that the above modem may be implemented without being integrated into the processor 1110 and through a separate chip.

The memory 1120 may include Random Access Memory (RAM), and may include Read-Only Memory (ROM). In some embodiments, the memory 1120 includes a non-transitory computer-readable storage medium. The memory 1120 may be configured to store command, programs, code, code sets, or command sets. The memory 1120 may include a stored program area and a stored data area. The stored program area may store a command for implementing an operating system, a command for at least one function (e.g., touch function, sound playback function, image playback function, etc.), a command for implementing each method embodiment of the present application, etc.; the stored data area may store data created based on the use of the terminal 1100 (e.g., audio data, phone book), etc.

The display module 1130 is a display component for image display and is usually arranged on a front panel of the terminal 1100. The display module 1130 may be designed as a full screen, curved screen, shaped screen, double-sided screen, or foldable screen. The display module 1130 may be designed as a combination of a full screen and a curved screen, and a combination of a shaped screen and a curved screen, which are not limited by the embodiments.

In the embodiments, the display module 1130 includes a DDIC chip 1131 and a display screen 1132 (panel). The display screen 1132 is an OLED display, which may be a low temperature poly-silicon (LTPS) AMOLED display or a low temperature polycrystalline oxide (LTPO) AMOLED display.

The DDIC chip 1131 is configured to drive the display screen 1132 for image display, and the DDIC chip 1131 is configured to implement the display rate conversion method provided in each of the above embodiments. In addition, the DDIC chip 1131 is connected to the processor 1110 via a MIPI interface for receiving image data as well as command from the processor 1110.

In some embodiments, the display screen module 1130 has a touch function. Through the touch function, the user can use any suitable object such as a finger or a touch pen to perform touch operations on the display module 1130.

In addition, it will be understood by those skilled in the art that the structure of the terminal 1100 shown in the accompanying drawings above does not constitute a limitation of the terminal 1100, and that the terminal may include more or fewer components than shown, or a combination of certain components, or a different arrangement of components. For example, the terminal 1100 may further include a microphone, a speaker, an RF circuit, an input unit, a sensor, an audio circuit, a Wireless Fidelity (Wi-Fi) module, a power supply, a Bluetooth module, and other components, which will not be described herein.

Those skilled in the art should be aware that in one or more of the above examples, the functions described in embodiments of the present disclosure may be implemented with hardware, software, firmware, or any combination thereof. When implemented using software, these functions may be stored in a computer-readable medium or transmitted as one or more instructions or code on a computer-readable medium. The computer-readable medium includes a computer storage medium and a communication medium, where the communication medium includes any media that facilitates the transmission of computer programs from one place to another. The storage medium may be any available medium accessible to a general purpose or specialized computer.

The foregoing are only optional embodiments of the present disclosure and are not intended to limit the present disclosure. Any modifications, equivalent replacements, improvements, etc., made within the spirit and principles of the present disclosure shall be included within the scope of the present disclosure.

What is claimed is:

1. A display screen rate conversion method, applied to a display driver integrated circuit (DDIC) chip of an organic light-emitting diode (OLED) display screen, comprising:
- initializing display screen parameters according to a first refresh rate;
- in response to receiving first image data sent by an application processor (AP), performing an image scanning according to the first refresh rate, comprising:
  - generating a vertical synchronous signal (Vsync) according to the VFP corresponding to the first refresh rate;
  - matching a timing of a first light-emitting (EM) start vertical (ESTV) with a timing of a vertical back porch (VBP), and performing an EM scanning according to an EM frequency; wherein a position of the VBP is determined according to a position of the Vsync; and
  - matching a timing of a first gate start vertical (GSTV) and the timing of the first ESTV, and performing a gate scanning according to the first refresh rate;
- in response to not receiving second image data sent by the AP within a preset delay duration of a vertical front porch (VFP) corresponding to the first refresh rate, adjusting the first refresh rate to a second refresh rate; wherein the second refresh rate is less than the first refresh rate; and
- adjusting the display screen parameters according to the second refresh rate.

2. The method according to claim 1, wherein in response to not receiving second image data sent by the AP within a preset delay duration of a vertical front porch (VFP) corresponding to the first refresh rate, the adjusting the first refresh rate to a second refresh rate comprises:
- in response to not receiving the second image data within the VFP corresponding to the first refresh rate, automatically extending the VFP by an extended duration; and
- in response to the extended duration reaching the preset delay duration and not receiving the second image data, adjusting the first refresh rate to the second refresh rate; wherein the preset delay duration is determined according to the VFP corresponding to the second refresh rate.

3. The method according to claim 1, after the adjusting the first refresh rate to a second refresh rate, further comprising:
- adjusting the VFP according to a position of a next ESTV, wherein a timing of a GSTV matches with a timing of the next ESTV after the VFP is adjusted.

4. The method according to claim 1, further comprising:
- after completing the image scanning, setting high a tearing effect (TE) signal and maintaining the TE signal at a high level; wherein the AP is configured to issue generated image data in response to the TE signal being at a high level.

5. The method according to claim 1, after the initializing display screen parameters according to a first refresh rate, further comprising:
- inverting a tearing effect (TE) signal according to the first refresh rate; wherein the AP is configured to determine whether generated image data exists in response to detecting a rising edge of the TE signal;
- wherein after the performing an image scanning according to the first refresh rate, the method further comprises:
  - inverting the TE signal according to a preset inversion rate, wherein the preset inversion rate is greater than the first refresh rate.

6. The method according to claim 1, further comprising: receiving a (light-emitting) EM frequency conversion command issued by the AP; and adjusting an EM frequency according to the EM frequency conversion command; wherein the adjusted EM frequency is an integer multiple of a current refresh rate.

7. The method according to claim 1, after the adjusting the display screen parameters according to the second refresh rate, further comprising:

in response to receiving third image data sent by the AP within the VFP corresponding to the first refresh rate, adjusting the second refresh rate to the first refresh rate; and adjusting the display screen parameters according to the first refresh rate.

8. The method according to claim 1, wherein the first refresh rate is a maximum refresh rate of the OLED display screen.

9. The method according to claim 8, wherein the adjusting the first refresh rate to a second refresh rate comprises:

adjusting the first refresh rate to the second refresh rate in a step-by-step manner; wherein the second refresh rate and the first refresh rate are adjacent refresh rates in terms of values.

10. The method according to claim 1, applied to the DDIC chip of the OLED in a mobile terminal.

11. A display screen rate conversion method, applied to a display driver integrated circuit (DDIC) chip of an organic light-emitting diode (OLED) display screen, comprising:

initializing display screen parameters according to a first refresh rate;

in response to receiving first image data sent by an application processor (AP), performing an image scanning according to the first refresh rate, comprising:

generating a vertical synchronous signal (Vsync) according to the VFP corresponding to the first refresh rate;

matching a timing of a first light-emitting (EM) start vertical (ESTV) with a timing of a vertical back porch (VBP), and performing an EM scanning according to an EM frequency; wherein a position of the VBP is determined according to a position of the Vsync; and matching a timing of a first gate start vertical (GSTV) and the timing of the first ESTV, and performing a gate scanning according to the first refresh rate;

in response to receiving second image data sent by the AP within a preset delay duration of a vertical front porch (VFP) corresponding to the first refresh rate, obtaining a time interval between a current moment and a falling edge of a n-th light-emitting (EM) start vertical (ESTV); wherein the n-th ESTV is a next ESTV of the current moment, wherein the n is an integer greater than zero; and adjusting the VFP according to the time interval, wherein a timing of a gate start vertical (GSTV) and a timing of an ESTV match after the VFP is adjusted.

12. The method according to claim 11, wherein the adjusting the VFP according to the time interval comprises:

obtaining a sum of durations of the VFP, the Vsync, and the VBP corresponding to the first refresh rate;

in response to the time interval being greater than the sum of the durations, performing a first method to adjust the VFP, wherein after the VFP is adjusted by the first method, the timing of the GSTV matches the timing of the n-th ESTV; and in response to the time interval being less than the sum of the durations, performing a second method to adjust the VFP; wherein after the VFP is adjusted by the second method, the timing of the GSTV matches the timing of a n+1th ESTV.

13. A mobile terminal, comprising:

an application processor (AP), an organic light-emitting diode (OLED) display screen, and a display driver integrated circuit (DDIC) chip;

wherein the AP and the DDIC chip are connected to each other through a mobile industry processor interface (MIPI);

wherein the DDIC chip is configured to perform a first method comprising:

initializing display screen parameters according to a first refresh rate;

in response to receiving first image data sent by the AP, performing an image scanning according to the first refresh rate, comprising:

generating a vertical synchronous signal (Vsync) according to the VFP corresponding to the first refresh rate;

matching a timing of a first light-emitting (EM) start vertical (ESTV) with a timing of a vertical back porch (VBP), and performing an EM scanning according to an EM frequency; wherein a position of the VBP is determined according to a position of the Vsync; and matching a timing of a first gate start vertical (GSTV) and the timing of the first ESTV, and performing a gate scanning according to the first refresh rate;

in response to not receiving second image data sent by the AP within a preset delay duration of a vertical front porch (VFP) corresponding to the first refresh rate, adjusting the first refresh rate to a second refresh rate; wherein the second refresh rate is less than the first refresh rate; and adjusting the display screen parameters according to the second refresh rate; or the DDIC chip is configured to perform a second method comprising:

initializing display screen parameters according to a first refresh rate;

in response to receiving first image data sent by an application processor (AP), performing an image scanning according to the first refresh rate, comprising:

generating a vertical synchronous signal (Vsync) according to the VFP corresponding to the first refresh rate;

matching a timing of a first light-emitting (EM) start vertical (ESTV) with a timing of a vertical back porch (VBP), and performing an EM scanning according to an EM frequency; wherein a position of the VBP is determined according to a position of the Vsync; and matching a timing of a first gate start vertical (GSTV) and the timing of the first ESTV, and performing a gate scanning according to the first refresh rate;

in response to receiving second image data sent by the AP within a preset delay duration of a vertical front porch (VFP) corresponding to the first refresh rate, obtaining a time interval between a current moment and a falling edge of a n-th light-emitting (EM) start vertical (ESTV); wherein the n-th ESTV is a next ESTV of the current moment, wherein the n is an integer greater than zero; and adjusting the VFP according to the time interval, wherein a timing of a gate start vertical (GSTV) and a timing of an ESTV match after the VFP is adjusted.

14. The mobile terminal according to claim 13, wherein in response to not receiving second image data sent by the AP within a preset delay duration of a vertical front porch (VFP) corresponding to the first refresh rate, the adjusting the first refresh rate to a second refresh rate comprises:

in response to not receiving the second image data within the VFP corresponding to the first refresh rate, automatically extending the VFP by an extended duration; and in response to the extended duration reaching the preset delay duration and not receiving the second image data, adjusting the first refresh rate to the second refresh rate; wherein the preset delay duration is determined according to the VFP corresponding to the second refresh rate.

15. The mobile terminal according to claim 13, after the adjusting the first refresh rate to a second refresh rate, further comprising:

adjusting the VFP according to a position of a next ESTV, wherein a timing of a GSTV matches with a timing of the next ESTV after the VFP is adjusted.

16. The mobile terminal according to claim 13, wherein in condition of the DDIC chip being configured to perform the first method, the first method further comprises:

after completing the image scanning, setting high a tearing effect (TE) signal and maintaining the TE signal at a high level; wherein the AP is configured to issue generated image data in response to the TE signal being at a high level.

17. The mobile terminal according to claim 13, wherein in condition of the DDIC chip being configured to perform the first method, after the initializing display screen parameters according to a first refresh rate, the first method further comprises:

inverting a tearing effect (TE) signal according to the first refresh rate; wherein the AP is configured to determine whether generated image data exists in response to detecting a rising edge of the TE signal;

wherein after the performing an image scanning according to the first refresh rate, the method further comprises:

inverting the TE signal according to a preset inversion rate, wherein the preset inversion rate is greater than the first refresh rate.

* * * * *